United States Patent [19]

Imsand et al.

[11] Patent Number: 4,458,330

[45] Date of Patent: Jul. 3, 1984

[54] BANDED VECTOR TO RASTER CONVERTER

[75] Inventors: Bruce E. Imsand, Huntsville; Chris L. Thomas, Harvest; David D. Dorfmueller, Owens Cross Roads, all of Ala.

[73] Assignee: Intergraph Corporation, Huntsville, Ala.

[21] Appl. No.: 263,192

[22] Filed: May 13, 1981

[51] Int. Cl.$^3$ ............................................. G06F 5/00
[52] U.S. Cl. .............................. 364/900; 340/744; 340/747; 364/521
[58] Field of Search ... 364/900 MS File, 200 MS File, 364/521; 340/744, 747, 739

[56] References Cited

U.S. PATENT DOCUMENTS

| | | | |
|---|---|---|---|
| 3,812,491 | 5/1974 | Barraclough et al. | 340/747 |
| 3,821,731 | 6/1974 | Levine | 340/747 |
| 3,870,922 | 3/1975 | Shutoh | 340/747 X |
| 3,893,075 | 7/1975 | Orban et al. | 364/900 |
| 3,895,357 | 7/1975 | Schwartz et al. | 364/200 |
| 3,996,585 | 12/1976 | Hogan et al. | 340/747 |
| 4,139,838 | 2/1979 | Inose et al. | 364/900 |
| 4,254,467 | 3/1981 | Davis et al. | 364/521 |

Primary Examiner—Raulfe B. Zache
Attorney, Agent, or Firm—Cushman, Darby & Cushman

[57] ABSTRACT

A vector to raster converter system in which vectors are delivered to the system and stored in a vector memory in groups. Each group includes all vectors which have at least a portion in a particular area of the output plot called a vector band. Vectors are serially read out of the vector memory and converted into a series of coordinates of points along the vector. The coordinates of each point are analyzed to determine if the point lies in a second particular area within the vector band called a raster band. The coordinates in the raster band are stored in a raster memory. After the entire vector band has been rasterized the contents of the raster memory are output to a plotter. The contents of the vector memory is then rasterized again and a determination is made as to whether each pair of coordinates is in the next raster band. This process continues until all of the raster bands in the vector band have been processed. All of the vectors in the next vector band are then loaded into the vector memory and the process continues.

77 Claims, 9 Drawing Figures

BANDED VECTOR TO RASTER CONVERTER

BACKGROUND OF THE INVENTION

1. Field of the Invention

The present invention relates to interface devices for electrostatic plotters, matrix plotters, matrix television systems and other systems which need matrix or rasterized data to operate. More particularly, the present invention relates to vector to raster converters.

2. History of the Prior Art

In many fields, such as interactive computer-graphics, computers are able to efficiently process data in the form of vectors. A vector is, in effect, a shorthand method of describing a line. Typically, a vector is represented either as two coordinates (the coordinates of its origin and the coordinates of its end point), or as the coordinates of its origin and the change between the origin and the end point in two or three dimensions, depending on whether we are dealing with a surface or a volume. Such a vector description is a shorthand notation as compared to the alternative of providing the coordinates of every identifiable point between the end points of the line.

Obviously, vector notation greatly reduces the amount of data that must be stored in a computer to describe the line. Furthermore, algorithms have been written for computers which efficiently and rapidly process the vector representations.

In addition, vectors may be considered to be mathematically accurate descriptions of lines in that vectors are continuous from endpoint to endpoint.

Output devices exist which can make efficient use of vector data. For example, pen plotters are well known in which the movement of a pen on a sheet of paper can be controlled in two dimensions. Thus, the pen in such a device is directed to the origin of the vector, and then the pen moves either to the coordinates of the end point of the vector or by the amount of change in the dimensions. In this manner, the vector is represented onto the paper. It is a good representation in that it is continuous just like the vector.

However, there are a number of systems which cannot efficiently process data in vector notation. One example of such a system is an electrostatic plotter. Such plotters are capable of simultaneously printing a plurality of selected dots in a particular row across a sheet of paper. The paper then moves by an incremental amount and selected dots in the next row are simultaneously printed. Such printers are generally referred to as line printers in that they print a scan line of dots at a time. In order to print a vector, the printer produces a series of dots which approximate the position of the vector. Thus, there may be any number of dots in a scan line used to represent vector approximations intersecting that scan line. Outputting vectors with a matrix plotter becomes more difficult as the number of vectors increases. For any given row on the output paper, it must be determined where dots should appear so that all of the appropriate vectors are represented.

A key difference, then, between a pen printer and an electrostatic plotter is that the pen printer can output continuous data, while an electrostatic plotter can only output discrete points. The electrostatic plotter must be supplied with data as to which of the plurality of possible discrete dots should be printed. This type of discrete data is referred to as matrix data or "rasterized" data. Other devices which require rasterized data include matrix plotters and raster television systems. A common element of all of these devices or systems is that data is displayed a row at a time.

Thus, for a computer which processes in vector notation to output data to such raster or matrix systems, the data must be rasterized. That is, vector notation must be converted to a raster or matrix format to determine where dots should be located on each scan line of the output device.

Many approaches are known for rasterizing vector data. The following patents relate generally to vector to raster conversion: U.S. Pat. Nos. 3,870,922—Shutoh and 3,821,731—Levine. In the most popular approach, the computer that has been processing the vectors actually does the conversion. First, the computer must define each vector in the plot and clip that portion of any vector which falls outside the area to be printed. Then, the computer must orient the vectors. That is, the computer must determine which end of each vector will appear on the output device first. After all of the vectors are oriented, the computer must order them. That is, the computer must make a list of the vectors in the order in which they will first appear on the output device. Finally, the computer must run through the list of vectors and convert each into a series of coordinates of the dots that approximate the vector.

Tasks such as these are relatively simple repetitive procedures which do not fully utilize the computational resources of a general purpose computer. Furthermore, such simple procedures can be implemented with special purpose hardware at a significant cost reduction and performance improvement.

Systems are presently being marketed where these tasks are performed by a microprocessor system in real time. In such a system, vectors are sent to the microprocessor system in random order. As each vector arrives, it is indexed, for example, using a linked tree-type scheme. The linked tree contains data as to where the next vector which will appear on the plot has been stored.

There are two problems with this approach. The most significant problem is that every vector in the entire plot must be stored, since the last vector sent from the computer to the microprocessor may be the first vector that will be printed. Although such a system does relieve the host computer of performing the entire rasterizing process, the system is still undesirable in that it must include an enormous amount of costly memory. Secondly this approach merely transfers the computational requirements from the host computer to the microprocessor. No processing speed improvements are realized since the microprocessor typically has no more processing capability than the host computer.

To speed the rasterizing process, those skilled in the art have resorted to specialized hardware rather than computers to organize and perform the conversion. In one class of such systems, a host computer generates vectors, orients them (i.e., determines which end of each vector will appear first), and determines which vectors fall within bands on the plot. Furthermore, the host computer divides the plot into equal size bands across the width of the drawing. The band size must be chosen so that the number of vectors appearing in any band does not exceed the capacity of the converting system. The host computer outputs one band of vectors at a time to the converting system where it is stored in vector memory. While the vectors are being loaded, parametric information such as slope and the like are also stored in the vector memory.

As the outputting of raster data begins, each vector in the vector memory is analyzed to determine whether it has any points which fall in the first row to be printed. All such vectors are then flagged as "active" vectors (i.e., those vectors crossing the scan line presently being outputted). The points at which the active vectors cross the scan line being outputted are then calculated, using a slope-intercept approach, and inserted in a scan line buffer. The data in the scan line buffer is then sent to the output device.

Then, the vector list is modified to eliminate those vectors that have been completely printed and to flag those vectors from the vector memory which should become active vectors for the next scan line. This process continues until all of the scan lines in the particular vector band are outputted. At the end of the vector band, all active vectors (i.e., those continuing into the next band) are saved and processed with the next vector band.

The vectors in the next band are then transferred from the host computer to the vector memory and the process described above is repeated.

The system described above has the advantage that the host computer's processing requirements have been reduced; specifically, a majority of the sorting requirements have been distributed and the rasterization process is completely performed by the converting system. However, a number of drawbacks are inherent in this system. Specifically, this system must process the entire vector list for every scan line. For each scan line to be outputted, the coordinates of the dots in that scan line are calculated employing the parametric data stored in the vector memory. The requirement of storing the parametric data greatly enlarges the vector memory, and thus the cost of the system. For example, each vector in the vector memory is described in about 100 bits of data. This is approximately four times the amount of memory needed to simply store the coordinates of the origin of the vector and either the coordinates of the end point or the amount of change between the origin and the end point.

Also, vectors (and not point coordinates) are analyzed to determine whether they fall within a particular scan line to be outputted. The making of this decision requires a relatively large amount of processing for each of the vectors. Thus, this also causes the system to be slow in processing data.

Finally, directed data must be supplied by the host computer to the converting system. That is the vector data must be oriented so that the origin, rather than the end point, of the vectors, will appear first in the plot. This vector manipulation is an additional processing step for the host computer.

The following U.S. patents teach systems similar to that described above in that vectors, and not raster coordinates, are analyzed to determine if the vector falls within a predetermined area or in any case should be processed next: U.S. Pat. Nos. 3,996,585—Hogan et al; 3,812,491—Barraclough et al; 3,893,075 Orban et al; and 3,895,357—Schwartz et al.

SUMMARY OF THE INVENTION

The present invention overcomes these problems by converting the vectors to a raster or matrix foramt *before* a decision is made as to whether each vector is ready to be outputted.

In the present invention, the host computer need only determine all vectors which have at least a portion in a particular area or vector band. The host computer outputs one band of vector data to the present invention at a time. The size of each band is determined by the density of the vectors in a particular area and the size of the memory in the present invention into which the vector band of data is loaded. Once a vector band of data is stored in the memory, referred to as the vector memory, each vector is serially selected and applied to a hardware vector to raster converter which generates a series of coordinates which correspond to points in the vector. These coordinates are applied to a comparator and a decision is made with respect to each as to whether it falls within a particular small area of the output within the particular vector band referred to as the raster band. If the coordinate does fall within a raster band, a bit is stored in a second memory, referred to as a raster memory, at an address related to the location of the coordinate.

All of the vectors in the vector band are processed in this fashion and a decision is made as to whether each generated coordinate is within one particular raster band. Once all of the vectors in the vector band have been so processed, the contents of the raster memory are output to, for example, an electrostatic plotter or other raster device.

Then, all of the vectors in the vector memory are again converted into coordinates and a decision is made with respect to each coordinate as to whether it is in the next raster band. If it is, the coordinate is stored in the raster memory. This process continues until all of the vectors in the vector memory have been processed for each of the raster bands in the vector band. Then, the host computer sends to the vector memory all of the vectors that have at least a portion in the next vector band. The present invention processes these vectors in the same manner.

Thus, for each raster band within a vector band, the entire vector band of data is rasterized. Decisions as to whether or not coordinates are in the raster band are made *after* rasterization.

At first blush, it may appear that the present invention is much less efficient than the prior art. However, the present invention is, in fact, much faster and more simple than the prior art. The primary reason for this is that hardware vector to raster converters operate many times faster than software processors. In fact, in the preferred embodiment of the present invention, an additional coordinate in a vector can be generated every 87 nsec. The decision as to whether each coordinate is within the raster band can be made at this rate. Thus, although every vector in a vector band must be rasterized for each raster band, the rasterizing (coordinate generating) process itself is sufficiently fast, compared to software processing, to overcome the supposed inefficiency. Therefore, the amount of time necessary to rasterize a vector band is comparatively small, so that the present invention operates very rapidly.

Furthermore, since the present invention does not require the vectors to be reoriented (so that the vector origins appear first on the output), and since it is not necessary to generate a vector list in order of appearance in the output (which, as will be recalled from above, are extremely time consuming processes) the present invention operates more rapidly than any vector to raster converting system presently known to the inventors.

To further enhance the speed of the present invention, both memories are double buffered. That is, two vector memories and two raster memories are provided. As the host computer sends vector data to one of the vector memories, the contents of the other vector memory are being processed by the vector to raster converter. When the vector memories are respectively filled and emptied, the role is reversed so that the host computer stores vector data in the second vector memory and the first vector memory provides data to the vector to raster converter.

As mentioned above, two raster memories are employed. As coordinate locations are being stored in the first raster memory, the contents of the second raster memory are being outputted. Once the first raster memory is full and the second raster memory is empty, coordinate data is then applied to the second raster memory and the contents of the first raster memory are outputted.

Not only is the present invention fast, but it is also simple and inexpensive to manufacture. Since vector manipulations are held to an absolute minimum, complicated computer programming is eliminated. Since the vector memory need only hold all of the vectors in a vector band, and since the raster memory need only hold data for a few lines of output, the amount of memory required by the present invention is comparatively small. Thus, the cost of the present invention is further reduced.

Also, in the prior art, as has been described above, clipping is performed by the computer as a separate and independent step in its processing, and thus takes time. In the present invention, if a portion of the vector should lie outside of the plot being outputted, the coordinates in that portion of the vector will always reside outside of the particular raster band being processed. Therefore the coordinates of those points will be disregarded, and thrown into the proverbial "bit bucket". Thus, in the present invention, clipping is performed "automatically" in that no separate and distinct clipping operation must be performed by any component.

BRIEF DESCRIPTION OF THE DRAWING

These and other objects and advantages of the present invention will become more apparent and more readily appreciated from the following detailed description of the presently preferred exemplary embodiment of the invention taken in conjunction with the accompanying drawing, of which.

DETAILED DESCRIPTION OF THE PRESENTLY PREFERRED EXEMPLARY EMBODIMENT

Figure 1:
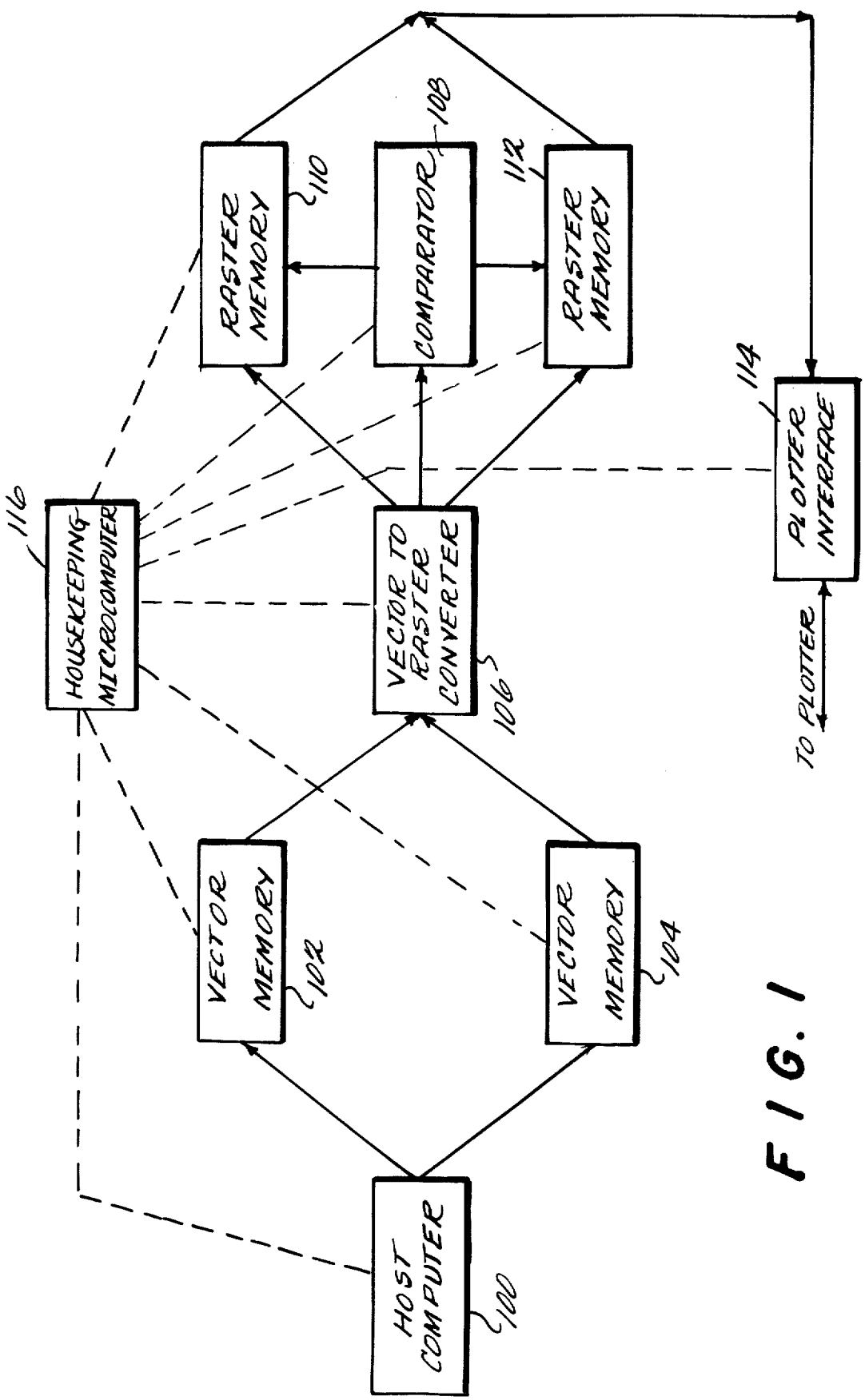
FIG. 1 is a schematic representation of the present invention.
Figure 2:
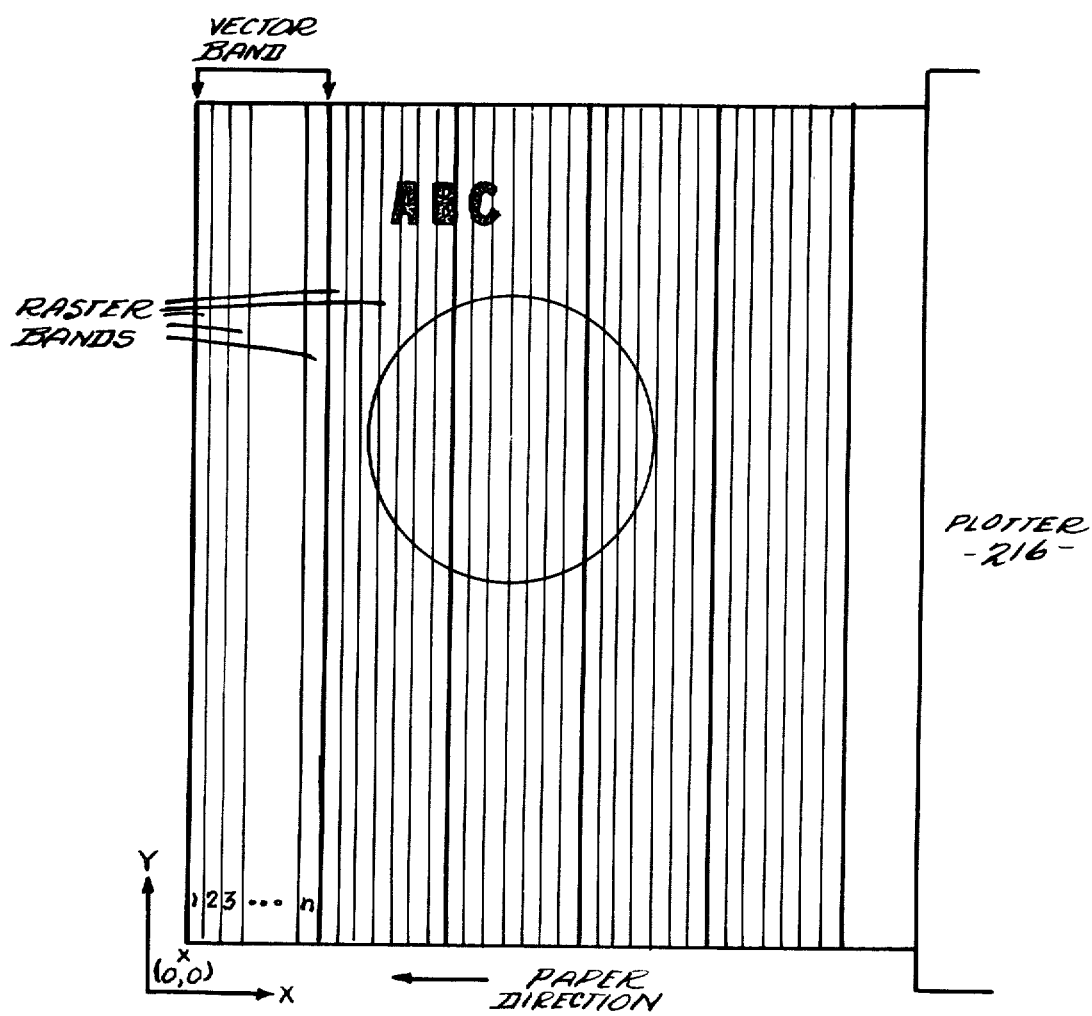
FIG. 2 is a schematic illustration of the relation of vector banding to raster banding.

Turning now to FIG. 1, host computer 100 provides the vectors to be rasterized. These vectors are applied to either vector memory 102 or vector memory 104 as will be described below. In the preferred embodiment, each vector memory 102 and 104 is a random access memory that can store 10,000 16-bit words that can be used to represent 4,000 to 7,000 vectors. However, most plots contain more vectors than this. Therefore, a technique called vector banding must be employed to rasterize an entire plot. FIG. 2 illustrates the concept of vector banding. In FIG. 2, plotter 216 is outputting a plot containing the letters "A", "B" and "C", and a circle. The plot may be thought of as containing a plurality of areas, referred to as vector bands, extending the full width of the plot. In FIG. 2 the heavy lines in the Y direction define vector bands. The first vector band contains no data. The second vector band contains the first portion of the circle and the letters "A" and "B". The third vector band contains the middle portion of the circle and the letter "C". The next vector band contains the last portion of the circle.

To accomplish vector banding, host computer 100 divides into vector bands the entire list of vectors. It is a vector band of data that host computer 100 sends to vector memory 102 or vector memory 104 at a time. Host computer 100 has only two requirements in regard to this transfer. First, the vector bands must be fed in order from the top of the output to the bottom. Second, host computer 100 must place in each vector band all vectors which have at least a portion within the vector band. However, within each band, vectors can be in any order and in any direction.

The only restriction on the area covered by a vector band is that all vectors contained within it must be able to be stored in one of vector memories 102 and 104. With a low density plot there may be only one vector band for the plot. For an extremely dense plot there may be many vector bands. If a plot contains 100,000 vectors, and if we can store 5,000 vectors in vector memory 102, the host computer 100 could divide the 100,000 vectors into twenty vector bands.

Some portions of the plot are usually more densely packed with vectors than other portions. Thus, if the plot were actually divided into the twenty vector bands of equal area, chances are some bands would contain more than the 5,000 permissible vectors. A method of dealing with this problem is to vary the area covered by a vector band in accordance with the density of the plot so that each vector band contains approximately the same number of vectors.

As described above, the only data necessary to describe a vector are the coordinates of its origin and either the coordinates of its end point or the change in the coordinates from the origin to the end point. Thus, for any vector, data need only be stored with respect to its origin and its end point. One possible method of adjusting the area covered by each vector band so that all contain approximately the same number of vectors is to divide a plot into a large number of incremental vector bands. As host computer 100 produces the vector list, it can easily generate a vector density histogram which describes the density of vectors in each incremental vector band. Then, it is a simple matter for host computer 100 to count the number of vectors starting and stopping in each incremental vector band. Host computer 100 may then group incremental vector bands into vector bands which contain approximately the same number of vectors, which number is close to but less than the maximum number of vectors that can be stored in each vector memory 102 or 104. As is well known in the art, the creation of vector histograms by host computers is not new, and does not play any part in the present invention.

In fact, the operations attributed to the host computer 100 outlined above need not even be performed by the host computer. Associative information processors are well known, such as the File Processor TM, maufactured by Intergraph, Corp. which will perform the vector banding. The File Processor TM examines a disk file containing all of the vector data and decides whether the vectors reside in a particular vector band and outputs these vectors. The File Processor TM is particularly useful in that a 100,000 vector plot can be sorted into bands in a matter of seconds (approximately 15 seconds), whereas it takes many minutes to sort into bands the same number of vectors with more conventional processors. However, the use of these devices to perform vector banding or the like is not new, as known to those skilled in the art, and does not play any part in this invention.

Vector memories 102 and 104 provide a double buffered vector memory. That is, as host computer 100 is loading vectors into one of vector memories 102 and 104, let us say vector memory 102 as an example, data is being outputted from vector memory 104. After vector memory 102 is loaded and vector memory 104 is empty, host computer 100 loads data into vector memory 104, while the contents of vector memory 102 are read out. This technique greatly speeds the rasterizing of the vectors.

Data from vector memories 102 and 104 are read out to vector to raster converter 106. The purpose of vector to raster converter 106 is to generate the coordinates of a series of points as close as possible to the actual vector. In the preferred embodiment of the present invention, this is accomplished using the Bresenham method. Before explaining the method, it will be necessary to define three terms used in the method: major axis, major axis, and $\Delta_i$. The preferred embodiment of the present invention employs cartesian coordinates. Therefore, the change in one dimension between the origin and the end point of a vector may be referred to as $\Delta x$ and the change in the other dimension may be referred to as $\Delta y$. The major axis is the axis with the larger absolute value of change. That is, x is the major axis when the absolute value of $\Delta x$ is larger than the absolute value of $\Delta y$, and vice versa. The absolute value of the amount of change of the major axis is referred to as $\Delta a$. The minor axis is the axis with the smaller absolute value of change, and this value is referred to as $\Delta b$. $\Delta_i$ is the decision function generated in the $i^{th}$ iteration of the method. According to the Bresenham method:

$$\Delta_{i+1} = \Delta_i + 2\Delta b - n2\Delta a, \text{ where } i = 1,2,3 \ldots$$
$$\Delta_1 = 2\Delta b - \Delta a$$
$$n = 1 \text{ if } \Delta_i \geq 0$$
$$= 0 \text{ if } \Delta_i < 0$$

One obviously starts to generate the coordinates with the origin of the vector. When $\Delta_i$ is greater than or equal to 0, both dimensions of the origin coordinates are incrementally changed to generate the next coordinate of a point along the vector. When $\Delta_i$ is less than zero, only the coordinate related to the major axis is incrementally changed to generate the next coordinates of a point along the vector. Thus, according to the Bresenham algorithm, the dimension corresponding to the major axis is always incrementally changed. The dimension corresponding to the minor axis is incrementally changed depending on the sign of the decision function, $\Delta_i$. The vector has been fully rasterized when $i + 1 = \Delta a$.

The coordinates generated by vector to raster converter 106 are applied to comparator 108. The function of comparator 108 is to determine if each of the coordinates generated by vector to raster converter 106 fall within a particular area of the vector band, called the raster band. FIG. 2 also illustrates the concept of raster banding. Each vector band is divided into a plurality of areas of equal size referred to as raster bands. If the coordinates do fall within the particular raster band being analyzed, comparator 108 enables a bit to be recorded in one of random access raster memories 110 and 112 at a location related to the coordinate. If the coordinate falls outside of the raster band presently being processed, the coordinate is simply discarded.

Thus, the raster band concept assigns a small amount of memory to a virtual address space or a raster band in the plot. Only the X and Y addresses contained within that virtual address space of the raster band memory are saved. A pass through the entire vector list describing the vector band must be made for every raster band area to be converted in the vector band. According to FIG. 2, all of the raster bands in the first vector band and the first two raster bands in the second vector band contain no vectors, and therefore would have no bits turned on in the raster memory during these passes through the vector list. The next pass through the vector list for the second vector band contains part of the circle. In this pass, bit addresses generated by the vector-to-raster converter would be stored in the raster memory. The bit addresses are stored in the raster memory because the virtual address space assigned to the raster memory during this pass would be the same as portions of the bit addresses generated by the vector-to-raster converter.

At the conclusion of this pass a portion of the drawing is in memory. This portion in memory can be output without any fear of missing any data. After the data is outputted, the memory is cleared and the next pass through the vector list is made by the vector-to-raster converter. At this time the raster memory is assigned to the virtual address space of the next raster band. A part of the character "A" and additional parts of the circle are stored in this pass. In the next two passes the remainder of the character "A" is rasterized along with other parts of the circle. This process continues until the entire plot has been generated.

Obviously, the size of the raster band is controlled by the amount of raster memory employed. In the preferred embodiment, each of raster memories 110 and 112 contains 131,072 bits. If the width of a plotting area is 20.48 inches, the width of the raster band will be 0.16 inches or 32 scan lines at 200 dots per inch. Raster memories 110 and 112 are actually configured similar to the plot. Thus, each bit in memory corresponds to a particular dot in the output in the raster band. Raster memories 110 and 112 can be reconfigured to adjust for the size of the plot. Thus, if the width of the plotting area doubles from 20.48 inches to 40.96 inches, the length of the raster band will change from 32 scan lines to 16 scan lines.

Raster memories 110 and 112 provide a single, double buffered memory. Thus, while vector to raster converter 106 provides data to raster memory 110, the contents of raster memory 112 are being read out. Once raster memory 110 is full and raster memory 112 is empty, vector to raster converter 106 provides data to raster memory 112, and the contents of raster memory are read out and sent to plotter interface 114.

Vector to raster convert 106, employed in the preferred embodiment of the present invention, can generate one coordinate every 87 nsec. However, raster memories 110 and 112 might be key speed bottlenecks, since it takes 217 nsec. to write data into the memory in the preferred embodiment. Faster memories could be used, but the cost of memories increases dramatically with speed. However, as has been described above, since the raster band is generally much smaller than a vector band, most of the coordinates generated by vector to raster converter 106 need not be stored in raster memories 110 and 112. Therefore, in the preferred embodiment, the rate at which vector to raster converter 106 operates is changed whenever a coordinate falls within the raster band.

As described above, the present invention appears to be inefficient since an entire vector band must be rasterized for each raster band. However, as will be developed below, vector to raster converter 106 provides no speed limitation in a typical case. As indicated above, vector to raster converter 106, in the preferred embodiment, performs one conversion every 87 nsec. Support there are 5000 vectors in each vector band, which value is indeed average for this preferred embodiment. Furthermore assume that the average length of each vector is 100 dots. Given a vector to raster conversion rate of 217 nsec./dot it will take 108.5 msec. to rasterize this vector band. Note that this vector to raster conversion rate is worst case and typically is much less since not all coordinates fall within the raster band and therefore can be processed at an 87 nsec. rate. Also note that the plotter output speed (i.e., the speed at which the paper moves out of the plotter) is typically 1 inch/sec. and that a typically plotter resolution is 200 scan lines per inch. This means that a scan line is output every 5 msec. or a raster band of 32 scan lines is output every 160 msec. Notice that the vector to raster conversion is faster than the speed at which the plotter can output. Thus, vector to raster converter 106 does not limit the speed of the preferred embodiment of the present invention.

Once one of the raster memories, for example, raster memory 110 has been fully loaded by vector to raster converter 106, the data stored therein is ready to be output. Thus, as illustrated in FIG. 1, raster memory 110 provides the data to plotter interface 114. Plotter interface 114 sends the data, in turn, to the plotter.

As can be well imagined, the interaction of the components referred to above must be coordinated. This coordination in the present invention is performed by housekeeping microcomputer 116. In the preferred embodiment, microcomputer 116 is the LSI 11/2 manufactured by Digital Equipment Corporation. The interaction of microcomputer 116 with the other elements will be described in more detail below with respect to FIG. 3 which is a timing diagram of the operation of the system illustrated in FIG. 1.

Figure 3:
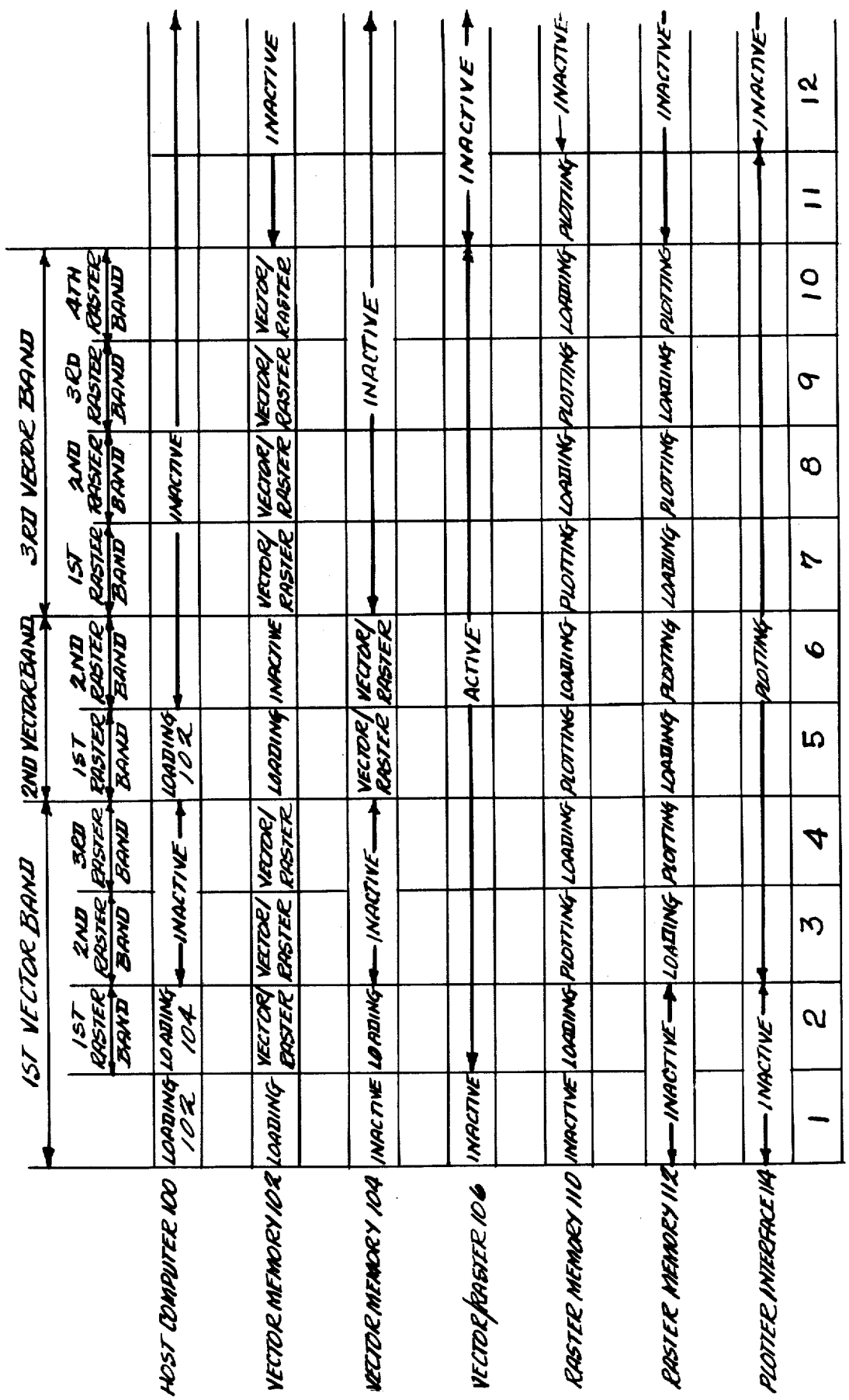
FIG. 3 is a timing diagram illustrating the operation of the device illustrated in FIG. 1.

FIG. 3 illustrates the operation of the circuitry in FIG. 1 for three vector bands of data. The first vector band includes three raster bands, the second vector band includes two raster bands, and the third vector bands includes four raster bands.

During a first time period, housekeeping microcomputer 116 causes host computer 100 to supply the first vector band of data to vector memory 102, and vector memory 102 accepts this data. During a second time interval, housekeeping microcomputer 116 causes host computer 100 to supply the second vector band of data to vector memory 104, and vector memory 104 accepts this data. At the same time, housekeeping microcomputer 116 causes vector memory 102 to serially output all of the vectors stored therein to vector to raster converter 106 which converts all of the vectors to raster or matrix data. Comparator 108 determines whether each of the points generated by vector to raster converter 106 lies within the first raster band of the first vector band. The location of those points lying within the first raster band are loaded in raster memory 110.

After the contents of vector memory 102 have been rasterized, and those points in the first raster band have been stored in raster memory 110, housekeeping microcomputer 116, during a third time period, causes the contents of vector memory 102 to again be rasterized by vector to raster converter 106. This time, however, comparator 108 determines whether any of the points generated by converter 106 lie within the second raster band of the first vector band. The positions of all such points are stored in raster memory 112. Also, since the location of all the points lying in the first raster band of the first vector band had been stored in raster memory 110 during the second time period, during the third time period, the contents of raster memory 110 are output to plotter interface 114, and eventually the plotter.

During a fourth time period, the contents of vector memory 102 are again rasterized by vector to raster converter 106. This time, comparator 108 determines whether any of the points generated by converter 106 lie within the third raster band of the first vector band. If so, the locations of these points are loaded in raster memory 110, since raster memory 110 was emptied during the third time period. Also, since during the third time period, raster memory 112 was loaded with the locations of all points in the second raster band of the first vector band, during the fourth time period, the locations of these points are output from raster memory 112 to plotter interface 114 so as to empty raster memory 112.

After the fourth time period, as a result of data that had been previously applied to housekeeping microcomputer 116, microcomputer 116 realizes that comparator 108 has compared the locations of the points generated by converter 106 against each of the three raster bands in the first vector band. Therefore, housekeeping microcomputer 116 causes host computer 100 to load the third vector band of data into vector memory 102. At the same time, housekeeping microcomputer 116 causes the contents of vector memory 104 (i.e., the vectors of the second vector band) to be rasterized by vector to raster converter 106. Comparator 108 determines whether the location of any of the points generated by converter 106 lies within the first raster band of the second vector band. If so, the locations of these points are stored in raster memory 112. At the same time, raster memory 110 contains the location of all of the points in the third raster band of the first vector band. These points are output to plotter interface 114.

During the sixth time period, housekeeping microcomputer 116 again causes the contents of vector memory 104 to be rasterized by vector to raster converter 106. Housekeeping microcomputer 116 causes comparator 108 to indicate those points which lie in the second raster band of the second vector band. The location of such points are loaded in raster memory 110. At the same time, the locations of the points in the first raster band of the second vector band stored in raster memory 112 are output to plotter interface 114.

As indicated above, the vector data for the third vector band was loaded in vector memory 102 during the fifth time period. Since all of the raster bands in the second vector band were processed during the fifth and sixth time periods, in the seventh time period, housekeeping microcomputer 116 causes the vector data for the third vector band stored in vector memory 102 to be applied to vector to raster converter 106. As this occurs, housekeeping microcomputer 116 causes comparator 108 to determine whether any of the points generated by vector to raster converter 106 lie within the first raster band of the third vector band. The locations of such points are stored in raster memory 112. At the same time, the locations of points in the second raster band of the second vector band stored in raster memory 110 are output to plotter interface 114.

This process continues through the tenth time period during which period the contents of vector memory 102 (i.e., vectors in the third vector band) are rasterized in converter 106 for the last time and comparator 108 determines whether any of the points generated by converter 106 lie within the fourth raster band of the third vector band. Such points are loaded in raster memory 110.

During the process described above, housekeeping microcomputer 116 is supplied with data as to the number of vector bands to be processed. Thus, in the eleventh time period, housekeeping microcomputer 116 is aware that the last vector band has been processed. All that remains is to output the last data from raster memory 110. Thus, during the eleventh time period housekeeping microcomputer causes the locations of the points of the fourth raster band of the third vector memory stored in raster memory 110 to be output to plotter interface 114.

Figure 4:
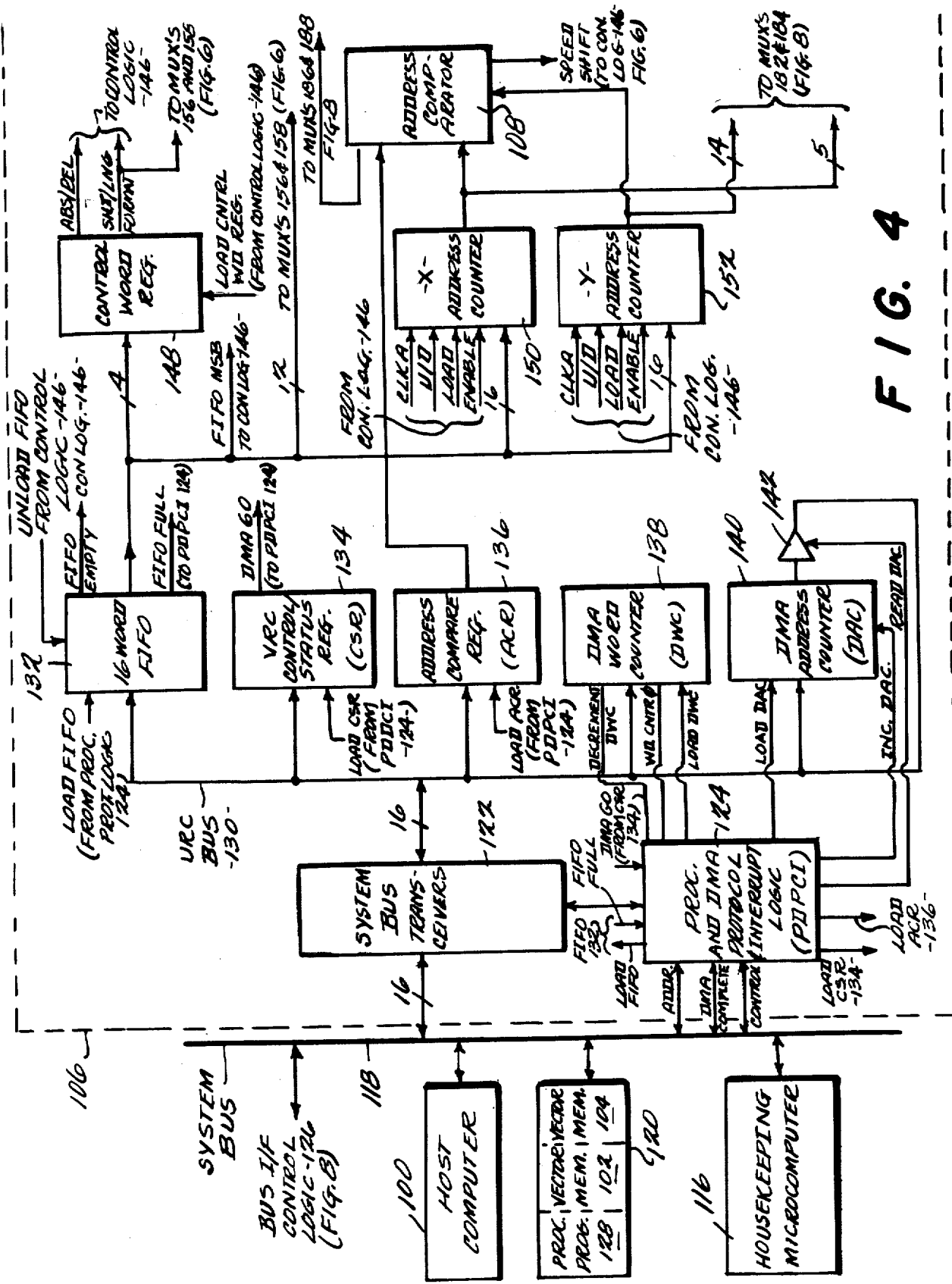
FIG. 4 is a block diagram of the vector to raster conversion portion of the present invention.
Figure 6:
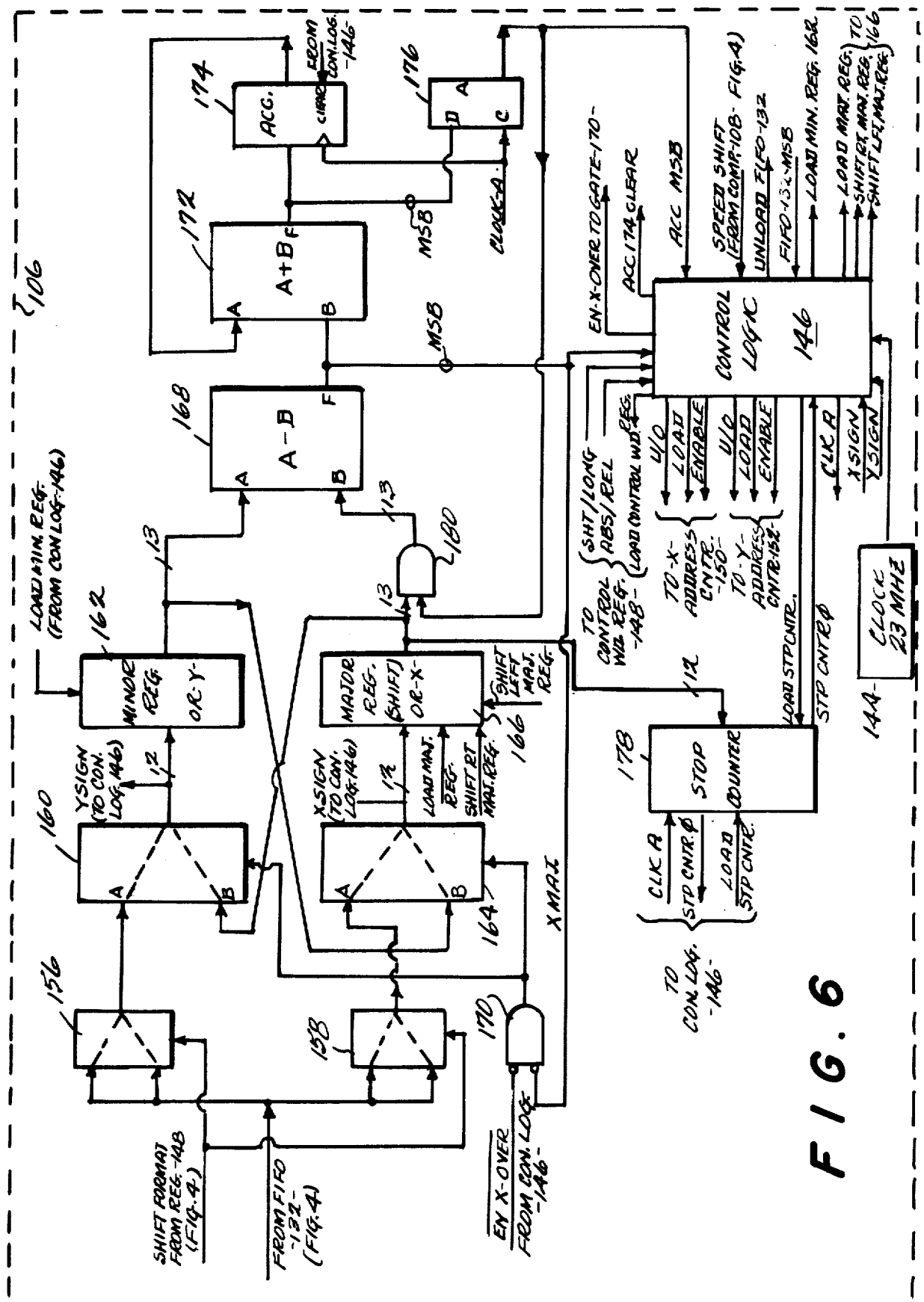
FIG. 6 is a block diagram of the algorithm generation portion of the present invention.
Figure 8:
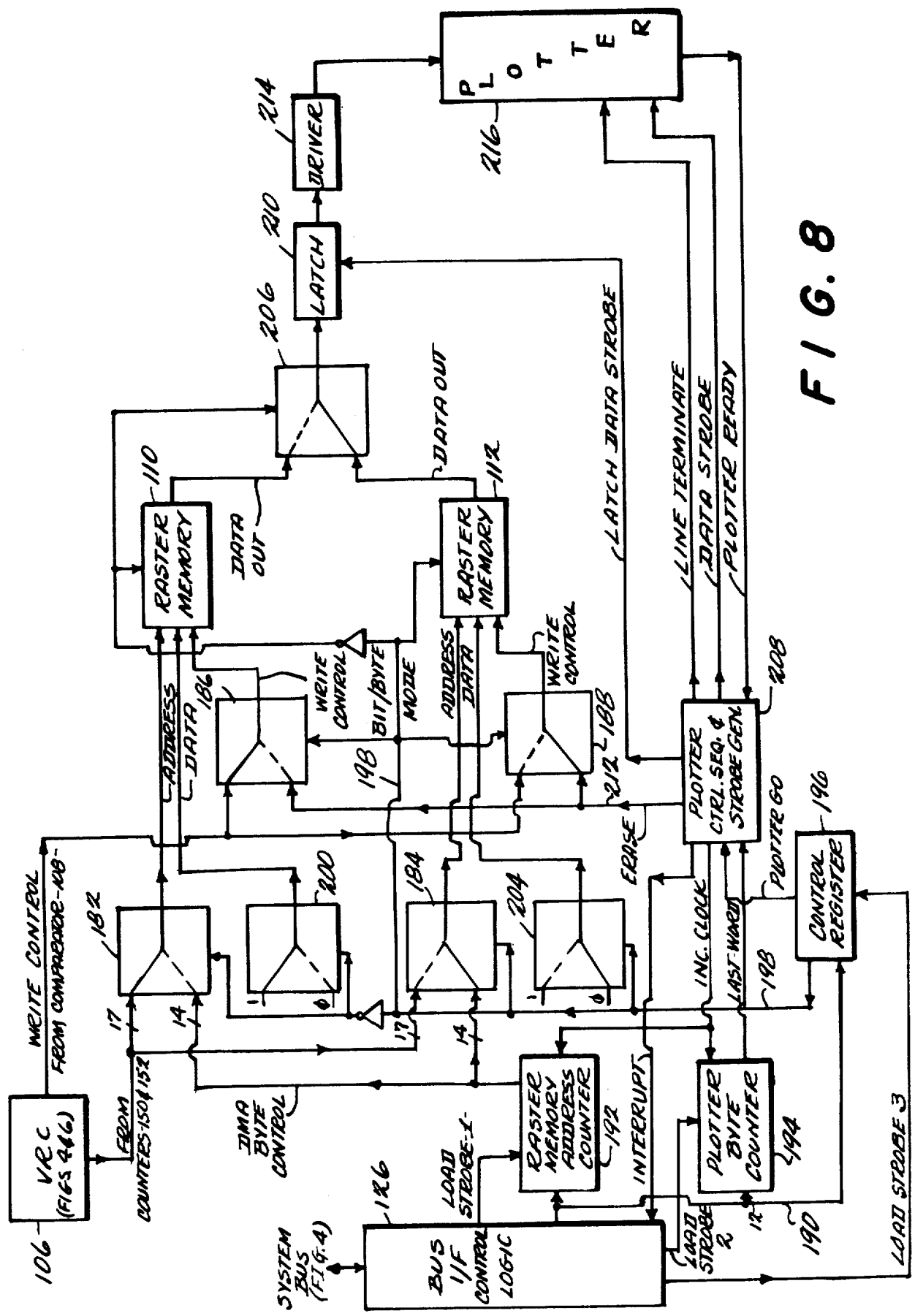
FIG. 8 is a block diagram of the raster memory portion of the present invention.

FIGS. 4, 6 and 8 illustrate in more detail the system shown in FIG. 1. As can be seen in FIG. 4, host computer 100 communicates with the remainder of the system via system bus 118. Also connected to bus 118 are housekeeping microcomputer 116, memory 120 associated with housekeeping microcomputer 116, system bus tranceivers 122, processor and DMA protocol control and interrupt logic (PDPCI) 124 and bus interface control logic 126 (illustrated and explained in more detail with respect to FIG. 8). Memory 120 includes the program memory 128 for microcomputer 116, in addition to vector memories 102 and 104. System bus transceivers 122 act as an interface between system bus 118 and VRC bus 130. In the preferred embodiment, transceivers 122 include transceiver chips designated DC005 which are manufactured by Digital Equipment Corp. These chips are four bit wide transceivers with address and decoding functions built in. The chips were obtained from Digital Equipment Corporation as part of a kit called the "CHIP KIT" For Interfacing With The LSI-11 Bus. PDPCI 124 enables the various registers connected to VRC bus 130 and controls the transfer of data from vector memories 102 and 104 to the remainder of vector to raster converter (VRC) 106. This control of the transfer of data is performed in response to housekeeping computer 116. The major components of PDPCI 124, in the preferred embodiment, include the DC010 DMA controller chip which generates bus control signals to manage data transfers on bus 118 when in a DMA mode, and the DC003 interrupt protocol chip which manages and generates necessary bus signals for interrupt transactions. These chips are also made by Digital Equipment Corporation and contained in the "CHIP KIT" referred to above.

As will be developed below, data is DMA'd from vector memories 102 and 104 to VRC 106. When data is transferred by a DMA (direct memory access) it means that the data is transferred without the assistance of an associated computer. Instead, a counter or the like addresses the memory and the counter is incremented to change the address being accessed. Thus, in order to set up DMA's, housekeeping microcomputer 116 provides a counter with the address of the first memory location from which information is to be retrieved and also provides another counter with the number of words of data to be transferred. Housekeeping microcomputer 116 then also provides a signal which starts the DMA. It receives a signal in the form of an interrupt when the DMA is finished.

In the preferred embodiment, vectors may be specified in a variety of manners. The system must distinguish between moves (where a hypothetical pen tracing a particular vector does not touch the paper), and draws (where a hypothetical pen tracing the vector would acutally draw a line). Movement of a hypothetical pen may also be made in relative terms or absolute terms. If absolute terms are employed, the instruction is for the hypothetical pen to go to one particular location on the plot. In the preferred embodiment, the absolute mode can only be employed with moves and not draws. The relative mode instructs the hypothetical pen to move particular distances in the x and y directions relative to the previous position. The relative mode may be used with either moves or draws.

Also, the preferred embodiment has the ability to represent vectors in either a long form or a short form. The short form is employed with short vectors when using the relative mode, while the long format is employed with the absolute mode or long vectors in the relative mode. In the short format, both dimensions of the vector ($\Delta x$, $\Delta y$) are stored in a single 16 bit word. In the long format, each 16 bit word represents either an x coordinate or a y coordinate.

Typically, the transfer of data for one vector requires the transfer of either two or three 16 bit words. The first word is a control word which contains information as to whether or not the relative or absolute mode is employed and whether or not the long or short format is employed. The next word transferred contains the x and y coordinates, if the short format is employed, or the x coordinate if the long format is employed. In the long format, an additional word is required to represent the y coordinate.

Connected to VRC bus 130 are system bus transceivers 122, first in, first out (FIFO) register 132, VRC control/status register (CSR) 134, address compare register (ACR) 136, DMA word counter (DWC) 138, and DMA address counter (DAC) 140. When data is being transferred from system bus 118 to VRC bus 130, a control signal to PDPCI 124 causes PDPCI 124 to generate a signal to enable the appropriate element connected to VRC bus 130 to receive the data.

FIFO 132 is capable of storing 16 words. When vector data is being transferred from vector memories 102 and 104 to VRC 106, the data is actually stored in FIFO 132. Data is DMA'd into FIFO 132 at a fixed rate, and is taken from FIFO 132 as needed by the remainder of VRC processor 106. Thus, FIFO 132 acts as a cushion to insure that the remainder of VRC 106 always has the data it needs to continue the process. PDPCI 124 authorizes FIFO 132 to accept data by generating a LOAD FIFO signal which is applied to FIFO 132. When FIFO 132 is full a signal is sent to PDPCI 124 to temporarily stop the transfer of data from vector memories 102 and 104 to FIFO 132.

VRC control/status register 134 generates signals indicative of the status of VRC 106 and initiates DMA transfers from vector memories 102 and 104 to FIFO 132. After microcomputer 116 has set up counters 138 and 140 for the DMA (as will be described below) housekeeping microcomputer 116 sends a bit to CSR 134. In response to this bit, CSR 134 generates a DMA GO signal which is directed to PDPCI 124. When this occurs, PDPCI 124 begins the DMA as will be described below.

Address compare register 136 receives a number from housekeeping microcomputer 116 (upon a LOAD ACR signal from PDPCI 124) that indicates the particular raster band to be processed in the vector band that is loaded into one of raster memories 110 and 112. The numbers stored in ACR 136 are compared against higher order bits of the coordinates generated by VRC 106 to determine if the point indicated by the coordinates is within the selected raster band.

DAC 140 addresses vector memory 102 or 104 during a DMA. DWC 138 indicates when the DMA transfer is finished. Thus, to begin a DMA, housekeeping microcomputer 116 loads the address of the first location in vector memory 102 or 104 to be accessed into DAC 140 via system bus 118, transceivers 122 and VRC bus 130 (upon a LOAD DAC signal from PDPCI 124). Housekeeping microcomputer 116 then places the total number or words to be transferred from vector memory 102 or 104 to FIFO 132 on system bus 118. This number passes from system bus 118 to transceivers 122 to VRC bus 130, and this number is stored in DWC 138 (upon a LOAD DWC signal from PDPCI 124). In the preferred embodiment DAC 140 and DWC 138 are contained in a single chip designated DC 006. This chip is made by Digital Equipment Corp. and is contained in the "CHIP KIT" referred to above.

After a DMA GO signal is received by PDPCI 124, PDPCI 124 enables DAC 140 to access vector memory 102 or 104 through buffer 142. After each accessing, PDPCI 124 increments DAC 140 and decrements DWC 138. This causes the next location in vector memory 102 or 104 to be retrieved. PDPCI 124 knows that the DMA transfer is finished when DWC 138 sends a WORD COUNTER 0 signal indicating that the number stored therein is zero.

Words are read out of FIFO 132 as needed. If the particular word being read out is a control word, as indicated by the most significant bit therein, the pertinent bits are fed to control word register 148. These bits indicate that this is a control word and whether the upcoming vector is in the long or short format, and the absolute or relative mode.

The output of x address counter 150 and y address counter 152 represent the coordinates of a point in the vector. As the next point in the vector is determined, there counters are incrementally changed. If an absolute move is being processed, address counters 150 and 152 are loaded with the next two words from FIFO 132, respectively. It is from these initial coordinates that counters 150 and 152 will be incrementally changed to trace the upcoming relative move or draw. If the particular vector being processed is a relative move or draw, the process simply starts from wherever the previous vector left off. The coordinates of the last vector end point are retained by counters 150 and 152 and the incrementation proceeds from there. Counters 150 and 152 are completely controlled by control logic 146.

Figure 5:
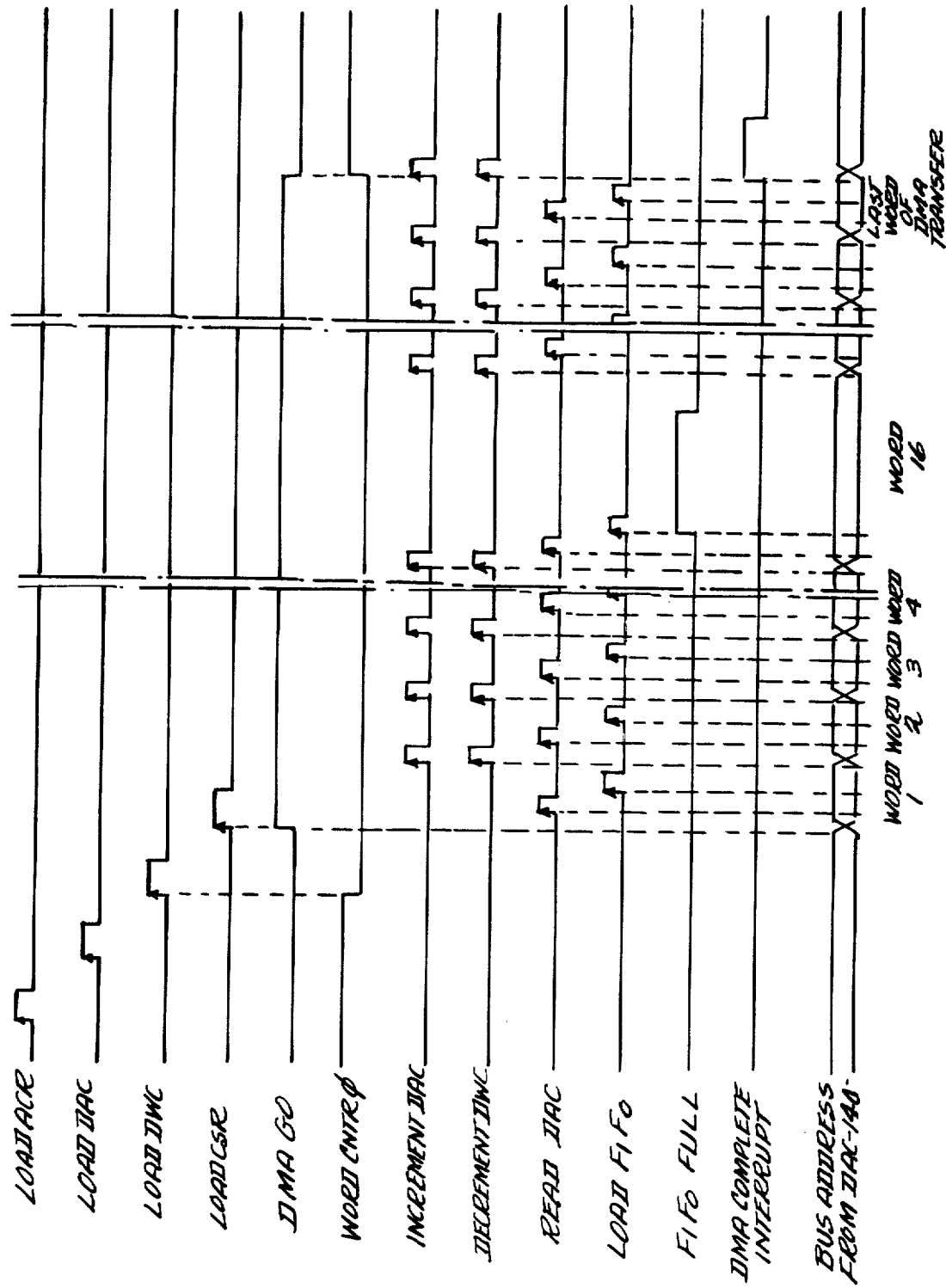
FIG. 5 is a timing diagram useful in understanding the circuitry illustrated in FIG. 4.

FIG. 5 is a timing diagram which illustrates the sequence of events in the DMA transfer of vector data from vector memories 102 and 104 to FIFO 132. FIG. 5 particularly illustrates the operation of PDPCI 124. The scenario pictured in FIG. 5 assumes that vector data is being applied to FIFO 132 until FIFO 132 becomes full (after 16 words are stored). Then, after a pause, data is removed from FIFO 132 and the DMA transfer into FIFO 132 continues.

To begin the DMA transfer, housekeeping microcomputer 116 causes a number related to the particular raster band being analyzed to be placed on VRC bus 130. Housekeeping microcomputer 116 then causes PDPCI 124 to generate a LOAD ACR signal so that address compare register 136 accepts this number.

Then, DMA address counter 140 is loaded with the first address of vector memory 102 or 104 to be accessed. To accomplish this loading procedure, housekeeping microcomputer 116 causes the particular address to appear on VRC bus 130. Then, housekeeping microcomputer 116 causes PDPCI 124 to generate a LOAD DAC signal which causes DMA address counter 140 to accept the data on VRC bus 130.

Next, DMA word counter 138 is loaded in a manner similar to DMA address counter 140 in response to a LOAD DWC signal. When DMA word counter 138 is loaded with the total number of words to be transferred into the DMA, the word count in DWC 138 is no longer zero so the WORD COUNTER 0 signal from DWC 138 becomes low.

Housekeeping microcomputer 116 then causes a bit to appear on VRC bus 130 to cause the initiation of the DMA transfer, and housekeeping microcomputer 116 causes PDPCI 124 to generate a LOAD CSR signal so that control status register 134 accepts the bit. In response, control status register 134 generates a DMA GO signal which is applied to PDPCI 124. In response to the DMA GO signal, PDPCI 124 generates a READ DAC signal which permits the address at the output of DMA address counter 140 to be applied to vector memory 102 or 104 and the contents of the addressed memory location appear on VRC bus 130. After the data has settled on bus 130 PDPCI 124 generates a LOAD FIFO signal which causes FIFO 132 to accept the data on VRC bus 130.

So that the next word can be transferred to FIFO 132, PDPCI 124 generates INCREMENT DAC and DECREMENT DWC signals to cause the output of DMA address counter 140 to be incremented and the output of DMA word counter 138 to be decremented. Again, the output of DAC 140 is applied to vector memory 102 or 104 in response to a READ DAC signal and the contents of the addressed memory location appear on VRC bus 130. PDPCI 124 then generates a LOAD FIFO signal to cause FIFO 132 to accept the data on VRC bus 130.

This process continues until sixteen LOAD FIFO signals have been generated so that FIFO 132 contains sixteen words. At this point, FIFO 132 is full and upon the sixteenth LOAD FIFO signal, FIFO 132 generates a FIFO FULL signal which is applied to PDPCI 124 to stop the DMA transfer. As long as the FIFO FULL signal is high, data is not transferred from vector memory 102 or 104 to FIFO 132.

Eventually, data is withdrawn from FIFO 132 so that it is no longer full. Upon this occurrence the FIFO full signal becomes low to enable PDPCI 124 to continue the DMA transfer. Accordingly, PDPCI 124 increments DMA counter 140 and decrements DMA word counter 138 and the data which appears on VRC bus 130 is accepted by FIFO 132.

This process continues until a number of words equal to the number initially stored in DMA word counter 138 are transferred to FIFO 132. At this point, DMA word counter 138 is decremented to zero and a WORD COUNTER 0 signal is applied to PDPCI 124. In response thereto, PDPCI 124 causes a bit to be written in control status register 134 so that the DMA GO signal becomes low. Also, PDPCI 124 generates a DMA COMPLETE INTERRUPT signal which is applied via system bus 118 to housekeeping computer 116 to inform housekeeping computer 116 that the DMA transfer is completed. Housekeeping microcomputer 116 can then establish the next DMA transfer.

As indicated above, in order to perform the Bresenham method, the change in the major axis, $\Delta a$, and the change in the minor axis, $\Delta b$ are needed by the apparatus. The vectors that are transmitted into FIFO 132 for performing a relative move or draw, however, are in the cartesian form $\Delta x$ and $\Delta y$. Therefore, a preliminary step must be performed prior to the execution of the Bresenham algorithm wherein it is determined which of $\Delta x$ and $\Delta y$ is the major axis value, $\Delta a$, and which is the minor axis value, $\Delta b$.

FIG. 6 illustrates the apparatus for performing the Bresenham method. As will be recalled, the vector may be in the long format or the short format. If it is in the short format, $\Delta x$ and $\Delta y$ are in the same word, and when the word is transferred from FIFO 132, MUX 156 selects the upper bits of the word, which is the $\Delta x$ value and this passes through MUX 164 to major register 166. If it is in the long format, then the next two words from FIFO 132 are used. MUX 156 routes the $\Delta y$ value to minor register 162 and MUX 158 routes the $\Delta x$ value to major register 166. A signal from control word register 148 indicates whether the vector is in the short or long format, and this signal is employed to control MUX's 156 and 158. When in the long format, the load signals to registers 162 and 166 from control logic 146 are used to control which accepts data from MUX's 156 and 158. As will be explained hereinafter, minor register 162 may be a simple register, whereas major register 166 must be a parallel loading shift register.

The lines connecting MUX 160 and register 162 and the lines connecting MUX 164 and register 166 are skewed to the left so that when data is transferred from these MUX's to the registers, a multiply by two operation is performed. Thus, register 162 is loaded with $2\Delta y$ and register 166 is loaded with $2\Delta x$. These numbers are applied to arithmetic unit 168 which performs a subtraction of the inputs.

As will be recalled from above, it is important to determine which of $\Delta x$ and $\Delta y$ is larger in order to perform the Bresenham method. The most significant bit of the output of arithmetic unit 168 is the sign bit and is employed to determine whether $\Delta y$ or $\Delta x$ is the major axis. If the most significant bit of the output of arithmetic 168 is positive, $\Delta y$ is the major axis. This most significant bit signal is applied to control logic 146 and to AND gate 170 where it is combined with an ENABLE CROSSOVER signal from control logic 146. The output of AND gate 170 causes MUX's 160 and 164 to switch so that the output of minor register 162 is applied to the input of major register 166 and the output of major register 166 is applied to the input of minor register 162. Thus, the minor axis register is reloaded with the contents of the major axis register, $2\Delta x$, while simultaneously the major axis register is loaded with the contents of the minor axis register. During this transfer, the data to major register 166 is skewed one place to the right to effect a divide by 2, so that $\Delta y$ is actually loaded into the major axis register.

If the most significant bit of the output of arithmetic 168 indicates a negative result, $2\Delta a$ is already in the major axis register so no reversal is necessary. However, register 166 skews the data therein one step to the right leaving $\Delta a$ in the register in response to a SHIFT RIGHT signal from control logic 146.

It should be noted that in FIG. 6, MUX's 156 and 160, and MUX's 158 and 164 are shown as separate elements to aid in explaining the circuit. In the preferred embodiment, MUX's 156 and 160 are combined in a single, three input, one output MUX, and likewise MUX's 158 and 164 are combined as a similar MUX. The combining of the four MUX's into two MUX's improves the speed at which data can be transferred through this system.

At this point, minor register 162 contains $2\Delta b$ and major register 166 contains $\Delta a$. These signals are applied to arithmetic 168, and the output, $2\Delta b - \Delta a$ is the value $\Delta_I$ from the Bresenham method. $\Delta_I$ is applied to an input of arithmetic unit 172 whose other input is zero, and the output of arithmetic unit 172, $\Delta_i$, is applied to accumulator 174. Only the most significant bit, the sign bit, of the output of arithmetic unit 172 is applied to flip-flop 176. $\Delta_I$ is loaded into accumulator 174 and flip-flop 176 upon receipt of the clock A signal from control logic 146. At this time, the value of $\Delta a$ from major register 166 is loaded in top counter 178. Also, as accumulator 174 is being loaded with $\Delta_I$, major register 166 shifts its contents one place to the left so that it contains $2\Delta a$. The apparatus is then able to execute the Bresenham method:

$$\Delta_{i+1} = \Delta_i + 2\Delta b - n2\Delta a$$
$$\text{where}$$
$$n = 1 \text{ when } i \geq 0,$$
$$n = 0 \text{ when } i < 0.$$

$\Delta_{i+1}$ is the output of arithmetic unit 172. The sign bit of $\Delta_{i+1}$, which determines the value of n for the next iteration of the algorithm, is applied to flip-flop 176, so that the output of flip-flop 176 represents the value of n. This value is applied to AND gate 180 to act as an enable signal. When the sign bit of $\Delta_i$ is positive, the output of flip-flop 176 is high, which enables gate 180 so that the value of $2\Delta a$ may pass from major register 166 to arithmetic unit 168. When the sign of $\Delta_i$ is negative, the output of flip-flop 176 is low, to disable gate 180 so that the value of $2\Delta a$ in register 166 is not passed on to arithmetic unit 168, in accordance with the Bresenham method.

For each iteration, that is each time accumulator 174 and flip-flop 176 is clocked by the CLOCK A signal, the CLOCK A signal also decrements stop counter 178. Also, for each iteration, the output of flip-flop 176, indicative of the sign a $\Delta_i$, is applied to control logic 146. At the time that the $\Delta x$ and $\Delta y$ values are initially loaded into the major and minor registers, respectively, the sign bit of $\Delta x$, which occurs in the same word as the magnitude $\Delta x$, is stored by the control logic 146, and similarly for the $\Delta y$ sign bit. Also, as previously described, a determination is made as to which of $\Delta x$ and $\Delta y$ is $\Delta a$ and which is $\Delta b$. This information is also retained in the control logic block 146. The control logic, therefore, has information as to which of $\Delta x$ and $\Delta y$ is the major axis and which is the minor axis and additionally, whether the x address counters will be incrementing or decrementing, since a positive sign for $\Delta x$ indicates that the x address counter will be incrementing, and similarly for the y address counter. According to the Bresenham method then, whichever of address counter 150 or address counter 152 that corresponds to the major axis will be either incremented or decremented for each iteration of the algorithm. Whichever of address counter 150 or address counter 152 that corresponds to the minor axis will be incremented or decremented only on those iterations of the algorithm for which the output of flip-flop 176 is low.

The iterations continue until the contents in stop counter 178 have been decremented to zero. At that point, stop counter 178 sends a STOP COUNTER 0 signal to control logic 146 which stops the present iterations by stopping the CLOCK A signals and sends a signal to FIFO 132 to unload the next word.

The contents of counters 150 and 152 are outputted to MUX's 182 and 184 in FIG. 8, and to address comparator 108. Address comparator 108 compares the contents of these counters with the contents of address compare register 136 to determine if the coordinates fall with the raster band indicated by the contents of address compare register 136. Note that both the x and y dimension of the particular raster band is compared with the contents of counters 150 and 152. If a coordinate falls outside of the length if the raster band, the coordinate may be picked up in another raster band. However, if the coordinate falls outside the width of the raster band, it is outside the area of the plot. Therefore, this comparison step performs a clipping function.

To compare two 16 bit numbers with two other 16 bit numbers, a great deal of apparatus is generally required. To lessen the amount of apparatus, raster bands are defined by binary boundaries. Consider a situation where there are only two raster bands in a vector band. To determine whether or not a vector is in one of the two raster bands, only the most significant bit of the coordinate need be compared. If the most significant bit is a 1, then the coordinate is in one raster band, but if the highest order bit is "0", then it is in the other raster band. Thus, address compare register 136 need only store one bit and comparator 108 need only compare one bit. If there are four raster bands in a vector band, then only the two highest order bits of the coordinate need be compared with a two bit number from the compare register 136. By employing a binary number of raster bands, it is possible to reduce the number of comparisons necessary to determine whether a coordinate is within a raster band to less than the 16 bits of the address.

Once comparator 108 determines that the coordinates from the x and y counters 150 and 152 are within the raster band specified by register 136, a SPEED SHIFT signal is sent from comparator 108 to control logic 146 to cause the frequency of the CLOCK A signal to be reduced by a factor of 2½ so that the location of the point in the raster band may be loaded into a raster memory. After the speed shift signal, comparator 108 sends a write control signal to MUX's 186 and 188 in FIG. 8, which causes the address specified by counters 150 and 152 to be written into one of memories 110 and 112.

Figure 7:
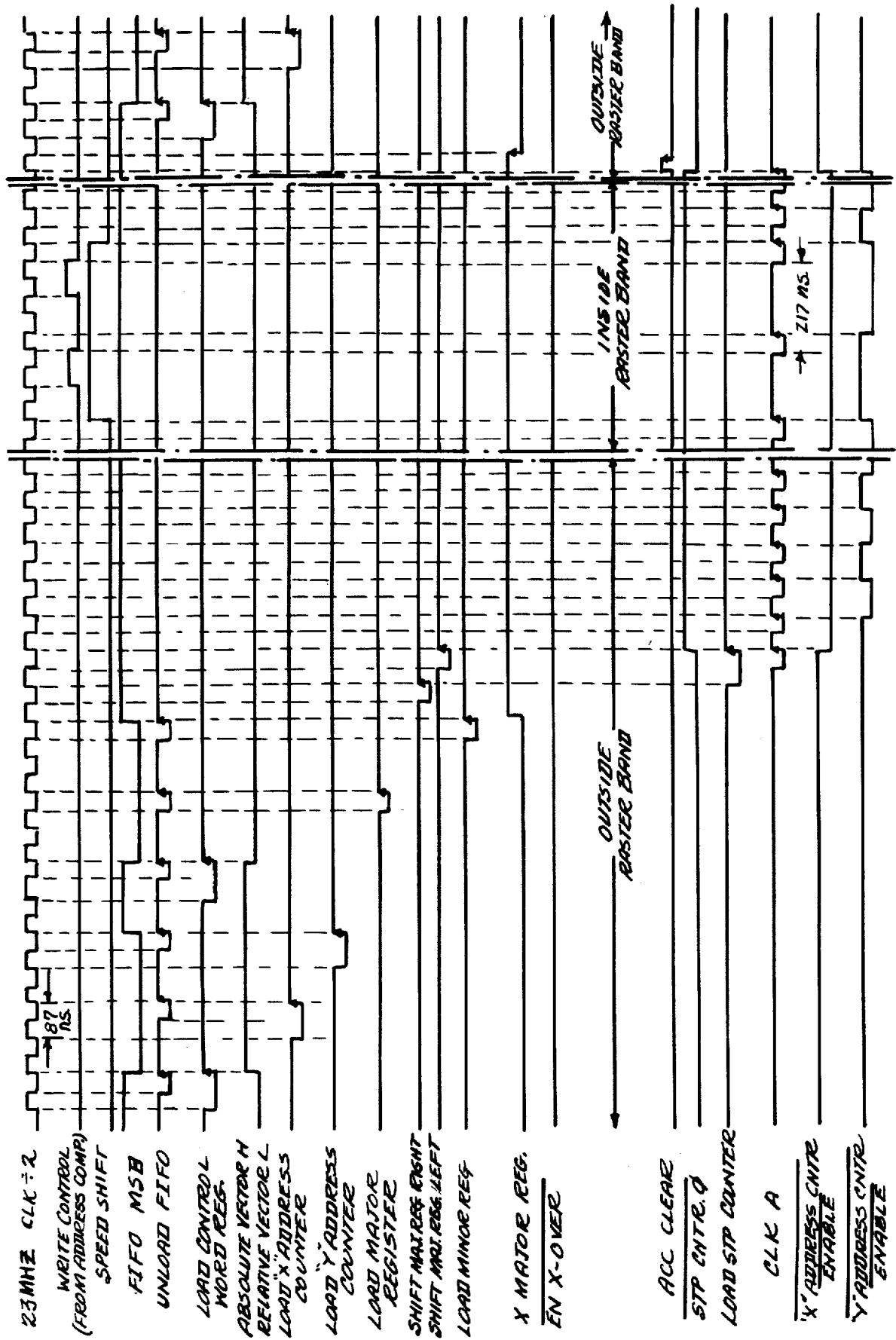
FIG. 7 is a timing diagram useful in understanding the circuitry illustrated in FIG. 6.

FIG. 7 is useful in understanding the operation of the circuitry in FIG. 6. FIG. 7 illustrates the timing of the components in FIG. 6 as these components process first an absolute move followed by a relative vector, and finally another absolute move. Furthermore, the long vector format is assumed to be employed. The scenario in FIG. 7 assumes that the $\Delta x$ value of the relative vector is larger than the $\Delta y$ value and the vector starts outside the raster band being processed, passes through the raster band, then continues on outside the raster band. While the vector is within the raster band, two points are written into memory.

As illustrated in FIG. 6, control logic 146 accepts a signal from clock 144. Clock 144 produces a 23 mhz. signal. Control logic 146 divides the frequency of the 23 mhz. signal by two in order to generate a signal having a period of 87 nsec. This signal is the basic timing signal for the circuitry of FIG. 6.

At the left side of FIG. 7, it is assumed that a word appears at the output of FIFO 132. The high level of the FIFO MSB signal (the most significant bit of the word appearing at the output of FIFO 132) indicates that the word at the output of FIFO 132 is a control word. The FIFO MSB signal is applied to control logic 146 and in response thereto, control logic 146 generates a LOAD CONTROL WORD REGISTER signal which causes control word register 148 to accept the appropriate bits of the word at the output of FIFO 132. These appropriate bits indicate that the next words at the output of FIFO 132 will represent an absolute vector, and a signal so indicating is applied to control logic 146. Also, a signal indicating that the long format is to be employed is applied to both control logic 146 and MUXs 156 and 158 of FIG. 6. At the same time that the word at the output of FIFO 132 is accepted by control word register 148, control logic 146 generates an UNLOAD FIFO signal which causes the next word stored in FIFO 132 to appear at its output.

Since control logic 146 has already accepted data indicating that the next two words from FIFO 132 represent an absolute vector, control logic 146 then generates a LOAD X ADDRESS COUNTER signal which causes X address counter 150 to accept the word at the output of FIFO 132. At the same time, control logic 146 generates another UNLOAD FIFO signal to cause the next word stored in FIFO 132 to appear at its output. Control logic 146 then generates a LOAD Y ADDRESS COUNTER signal so that Y address counter 152 accepts the output of FIFO 132. Thus, at this point, the X and Y address counter 150 and 152 are loaded with absolute coordinates received from FIFO 132.

At the same time that control logic 146 generates the LOAD Y ADDRESS COUNTER signal, it also generates another UNLOAD FIFO signal which causes the next word in FIFO 132 to appear at the output thereof. In the scenario illustrated in FIG. 7, this word is a control word as indicated by its most significant bit and this information is transferred to control logic 146. Accordingly, control logic 146 next generates a LOAD CONTROL WORD REGISTER signal to cause control word register 148 to accept the pertinent bits of the word at the output of FIFO 132. These pertinent bits indicate that the following words from FIFO 132 relate to a relative vector in the long format and this data is transferred to control logic 146.

Simultaneous with the generation of the load control word register signal, control logic 146 generates an UNLOAD FIFO signal so that the next word in FIFO 132 appears at its output. Since control logic 146 has received data that the circuitry is processing a relative vector, the data at the output of FIFO 132 is to be applied to major register 166, and accordingly control logic 146 generates a LOAD MAJOR REGISTER signal. Simultaneously with the generation of the LOAD MAJOR REGISTER signal, control logic 146 also generates an UNLOAD FIFO signal to cause the next word in FIFO 132 to appear at its output. This word is loaded in minor register 162 in response to a LOAD MINOR REGISTER signal generated by control logic 146.

As was discussed supra, data transferred from MUXs 160 and 164 to minor register 162 and major register 166 is multiplied by two due to a skewing of the lines interconnecting these components. The values in minor register 162 and major register 164 are applied to arithmetic unit 168 which generates a value related to their difference. The most significant bit of this difference, the sign bit, indicates whether the contents of the major or minor register is greater and this most significant bit is applied to control logic 146. An X major register, internal to control logic 146 accepts the contents of this most significant bit. As illustrated in FIG. 7, the most significant bit is a high level, indicating that the value in major register 166 is in fact larger than the value in minor register 162. Therefore, it is not necessary to interchange the contents of the major and minor registers.

As will be recalled from above, in order to detemine the value of $\Delta_i$, it is necessary to obtain the value of $\Delta a$. Accordingly, control logic 146 generates a SHIFT MAJOR REGISTER right signal which causes the contents of major register 166 to be divided by two. The value of $\Delta_i$ then appears at the input to accumulator 174.

With the rising edge of the CLOCK A signal, a number of events occur simultaneously. The value at the input of accumulator 174 is loaded into accumulator 174. The value of $\Delta a$ in major register 166 is loaded in stop counter 178 in response to a LOAD STOP COUNTER signal from control logic 146. As a result, the value in stop counter 178 is no longer zero so the STOP COUNTER 0 signal becomes high. Simultaneously with the first CLOCK A signal, control logic 146 also generates a SHIFT MAJOR REGISTER LEFT signal to cause the contents of major register 166 to shift one bit to the left, thus multiplying the value in major register 166 by two so that it contains $2\Delta a$.

It will be recalled from above that the CLOCK A signal also increments or decrements x and y address counters 150 and 152. In order to control when counters 150 and 152 should be incremented or decremented, enable signals are generated by control logic 146 and applied to counters 150 and 152. Control logic 146 already contains data indicating that the x coordinate is the major coordinate because it was not necessary to interchange the contents of the major and minor registers during set up for the relative vector. Therefore, control logic 146 causes x address counter 150 to be enabled by low X ADDRESS COUNTER ENABLE signal so that it accepts all CLOCK A signals to increment or decrement its contents. The results of the Bresenham method, are applied to control logic 146 by means of the ACCUMULATOR MOST SIGNIFICANT BIT signal. In response to the level of the ACCUMULATOR MOST SIGNIFICANT BIT signal, control logic 146 causes y address counter 152 to be enabled at appropriate times by means of the Y ADDRESS COUNTER ENABLE signal so that the contents of x and y address counters 150 and 152 reflect coordinates of points along the vector. The circuitry illustrated in FIG. 6 continues to perform iterations of the Bresenham method in response to CLOCK A pulses.

With each pair of coordinates stored in counters 150 and 152, comparator 108 determines whether the pair of coordinates lie within the raster band. At some point in the processing of the vector illustrated in FIG. 7, coordinates are generated within the raster band. Accordingly, comparator 108 generates a SPEED SHIFT signal which remains high until a pair of coordinates are generated which do not lie within the raster band. The SPEED SHIFT signal is applied to control logic 146 which initiates the procedures necessary to write into raster memory 110 or 112. A part of this procedure is the generation of a WRITE CONTROL signal which is applied to vector memory 110 or 112 as will be described hereinafter.

As indicated above, when writing into the raster memories, it is necessary to slow the speed of the vector to raster converter to match the maximum speed at which data may be written into the raster memories of the preferred embodiment. Accordingly, upon receipt of the SPEED SHIFT signal, control logic 146 causes the 23 mhz. signal from clock 144 to be divided by five instead of by two, to produce a signal with a period of 217 nsec. This corresponds to the maximum speed at which data may be written into the raster memories of the preferred embodiment.

Accordingly, as illustrated in FIG. 7, 217 nsec. lapse between the first rising edge of the CLOCK A signal at which a favorable comparison is made and the next rising edge of the CLOCK A signal. With this rising edge, the next iteration of the Bresenham method is performed and comparator 108 determines that the new coordinates also lie within the raster band. Accordingly, the SPEED SHIFT signal remains high and at the appropriate time, control logic 146 generates another WRITE control signal.

Another 217 nsec. elapse before the next rising edge of the CLOCK A signal and thus the next iteration of the Bresenham method. With this next iteration, coordinates are generates which comparator 108 determines to be outside the raster band. Accordingly, the SPEED SHIFT signal becomes low and the CLOCK A signal resumes its higher frequency.

It will be recalled that stop counter 178 contains the value of $\Delta a$ which also corresponds with the total number of iterations necessary to process a particular vector. With each rising edge of the CLOCK A signal, stop counter 178 is decremented. When the vector has been fully processed, the value in stop counter 178 becomes zero so that the STOP COUNTER 0 signal becomes low. When control logic 146 receives this low signal, it prepares the circuitry of FIG. 6 for the processing of the next vector. Accordingly, control logic 146 generates an ACCUMULATOR CLEAR signal which clears the contents of accumulator 174. Also, the contents of the x major register within control logic 146 are also cleared.

When control logic 146 generated the LOAD MINOR REGISTER signal illustrated in FIG. 7, it also generated an UNLOAD FIFO signal so that the next word stored in FIFO 132 appears as its output. The most significant bit of this word indicates that the word is in fact a control word, and accordingly the FIFO MOST SIGNIFICANT BIT signal remained high throughout the processing of the vector. After control logic 146 has initialized the circuitry in FIG. 6, it is ready to process this control word. Accordingly, control logic 146 generates a LOAD CONTROL WORD REGISTER signal which causes the appropriate bits in the word to be applied to control word register 148. This control word indicates that the next data from FIFO 132 will represent an absolute vector and accordingly this data is transferred to control logic 146. The process continues in the manner described above with respect to the first absolute vector.

Thus, FIG. 7 illustrates the manner in which control logic 146 and the circuitry of FIG. 6 generally process a relative vector having a Δx value greater than a Δy value and a long format. If the Δy value had been greater than the Δx value, the timing diagram would have been very similar to FIG. 7, with changes as follows. Instead of the X MAJOR REGISTER signal becoming high, it would have remained low. This signal remaining low would have caused control logic 146 to generate a low ENABLE CROSSOVER signal for one clock period. The combination of the X MAJOR and ENABLE CROSSOVER signals in AND gate 170 would have caused MUXs 160 and 164 to accept the output of major register 166 and minor register 162, respectively. When the ENABLE CROSSOVER signal would become high with the next clock pulse, control logic 146 would also have generated LOAD MAJOR and MINOR REGISTER signals to cause minor register 162 and major register 166 to accept the output of MUXs 160 and 164. As described above, since data transferred from the output of minor register 162 to the input of major register 166 is shifted one bit to the right, control logic 146 would not have generated the SHIFT MAJOR REGISTER RIGHT signal after the minor register was loaded. These are the only changes that are necessary to FIG. 7 when Δy is greater than Δx.

If the relative vector being processed had been in the short format instead of the long format, the following minor changes would have appeared in FIG. 7. Instead of sequentially generating LOAD MAJOR REGISTER and LOAD MINOR REGISTER signals with consecutive UNLOAD FIFO signals, the LOAD MAJOR REGISTER and LOAD MINOR REGISTER signals would have been generated simultaneously, since the same word at the output of FIFO 132 would contain both Δx and Δy.

Turning now to FIG. 8, the circuitry associated with raster memories 110 and 112 is illustrated. All of the MUX's in this figure are shown with one input path drawn solidly and another input path drawn in dotted line. The paths drawn solidly correspond to a situation where data is being stored in raster memory 110 and data is being read out of raster memory 112. As will be described below, housekeeping computer 116 controls which raster memory is being loaded and which raster memory is being emptied.

As indicated above, vector memories 102 and 104, as well as raster memories 110 and 112 both provide double buffering. However, vector memories 102 and 104 are double buffered in a slightly different fashion than raster memories 110 and 112. Specifically, data cannot be loaded into one of the vector memories 102 and 104 simultaneously with the unloading of data from the other vector memory. There is only one set of lines connecting host computer 100 with vector memories 102 and 104 and data can pass in only one direction at a time on these lines. Furthermore, the loading and unloading of vector memories 102 and 104 is not a continuous process. Thus, vector memories 102 and 104 provide double buffering in that the loading of vectors in one vector memory is interspersed in time with the unloading of vectors from the other vector memory. When one vector memory is full and the other empty, the roles reverse and the process continues.

As described below, the loading and unloading of raster memories 110 and 112 is, comparatively speaking, a continuous process, and both processes occur simultaneously, independent of the other.

At the start of one particular cycle in the operation of FIG. 8, one of raster memories 110 and 112 is full of data and the other is empty. Housekeeping computer 116 controls which raster memory has been loaded and which raster memory has been unloaded. As indicated above, housekeeping computer 116 controls the DMA's in the system and the transfer of data from the raster memories to the plotter is no exception.

At the beginning of a cycle, it is necessary for housekeeping computer 116 to set up control logic required to transfer data from one of the raster memories to the plotter. Housekeeping microcomputer 116 communicates with the circuitry illustrated in FIG. 8 via system bus 118 and bus interface control logic 126. First, housekeeping microcomputer 116 causes the address of the first location in the raster memory to be read out to the plotter to be placed on bus 190 in FIG. 8. Housekeeping microcomputer 116 then causes bus interface control logic 126 to generate a signal on the load strobe 1 line to cause raster memory address counter 192 to accept the data. Counter 192 plays the same role in transferring data out of the raster memories as address counter 140 played in transferring data out of the vector memories.

Next, housekeeping microcomputer 116 causes the total number of bytes to be read out of the raster memories to be placed on bus 190. At the same time, housekeeping microcomputer 116 causes bus interface control logic 126 to generate a signal on the load strobe 2 line so that plotter byte counter 194 accepts the number on common bus 190. Counter 194 is related to the output of data from the raster memories in the same way that counter 138 is related to vector memories 102 and 104.

Finally, housekeeping microcomputer 116 causes a signal to be placed on bus 190 to indicate which of raster memories 110 and 112 will be loading data and which will be emptying data. Simultaneously, housekeeping microcomputer 116 causes bus interface control logic 126 to generate a signal on the load strobe 3 line so that control register 196 accepts this data. This causes control register 196 to generate a level on line 198 that controls the gating within MUX's 182, 184, 186, 188, 200, 204 and 206. Let us assume that raster memory 110 is empty and raster memory 112 is full. Thus, housekeeping microcomputer computer 116 causes all of the MUX's in FIG. 8 to assume the gating indicated in solid lines in the figure. During this portion of the operating cycle, the output from counters 150 and 152 in VRC 106 is applied through MUX 182 to the address input of raster memory 110. MUX 200 causes a high level, or a "1" level to be applied to the data input of raster memory 110. When comparator 108 determines that a coordinate is within the raster band specified by address register 136, comparator 108 generates a write control signal which is applied through MUX 186 to the write input of raster memory 110. This causes a "1" to be written in the bit specified by the signal on the address lines, i.e., at an address representing the coordinates at the output of counters 150 and 152. This process continues until all of the vectors in the particular vector band have been rasterized and each set of coordinates therein have been compared to determine if they are in the raster band for which coordinates are being loaded into raster memory 110.

At the same time that control register 196 receives the signal from housekeeping computer 116 as to which raster memory is to receive data, control register 196 also receives a signal from housekeeping computer 116 that the transfer of data out of the other raster memory can begin. Thus, on receipt of the signal from housekeeping computer 116, control register 196 generates a plotter go signal which is applied to plotter control sequencer and strobe generator 208. The number at the output of address counter 192 is applied through MUX 184 to the address input of raster memory 112. This causes the contents of the particular location being addressed to be applied to MUX 206 and latch 210. Plotter control sequencer and strobe generator generates a latch data strobe to cause latch 210 to receive and hold the signal from the output of raster memory 112.

It is then necessary to erase the bits stored at that particular address. To this end, the data input of raster memory 112 is connected through MUX 204 to a low or "0" level. Plotter control sequencer and strobe generator 208 generates an erase signal on line 212 which is transmitted to raster memory 112 by means of MUX 188. This causes a "0" level to be written into the bit presently addressed. Shortly thereafter, plotter control sequencer and strobe generator 208 generates an increment clock signal which is used to increment and decrement counters 192 and 194, respectively. This causes counter 192 to address the next location in raster memory 112 and the process is repeated.

The data stored in latch 210 is transferred to driver 214 and then to plotter 216. Plotter control sequencer and strobe generator 208 then sends a data strobe signal to plotter 216 to accept the data in latch 210 as soon as plotter control sequencer and strobe generator 208 has received a plotter ready signal from the plotter.

A continuous transfer of data from the raster memories lasts for one scan line of the plotter. The count stored in plotter byte counter 194 is the number of bytes in one plotter line. When the last byte is reached, a signal on the increment clock line causes byte counter 194 to decrement to "0" which causes counter 194 to send a last word signal to plotter control sequencer and strobe generator 208. This causes plotter control sequencer and strobe generator 208 to generate a signal on the interrupt line which is directed to housekeeping computer 116 via bus interface control logic 216. This tells housekeeping microcomputer 116 that the circuitry in FIG. 8 is ready for the next transfer of information to the plotter. Also, after the last word has been accepted by plotter 216, plotter sequencer 208 generates a line terminate signal to plotter 216 which causes all of the data which has been accepted in a buffer in plotter 216 to be actually printed on the paper and the paper advanced.

Figure 9:
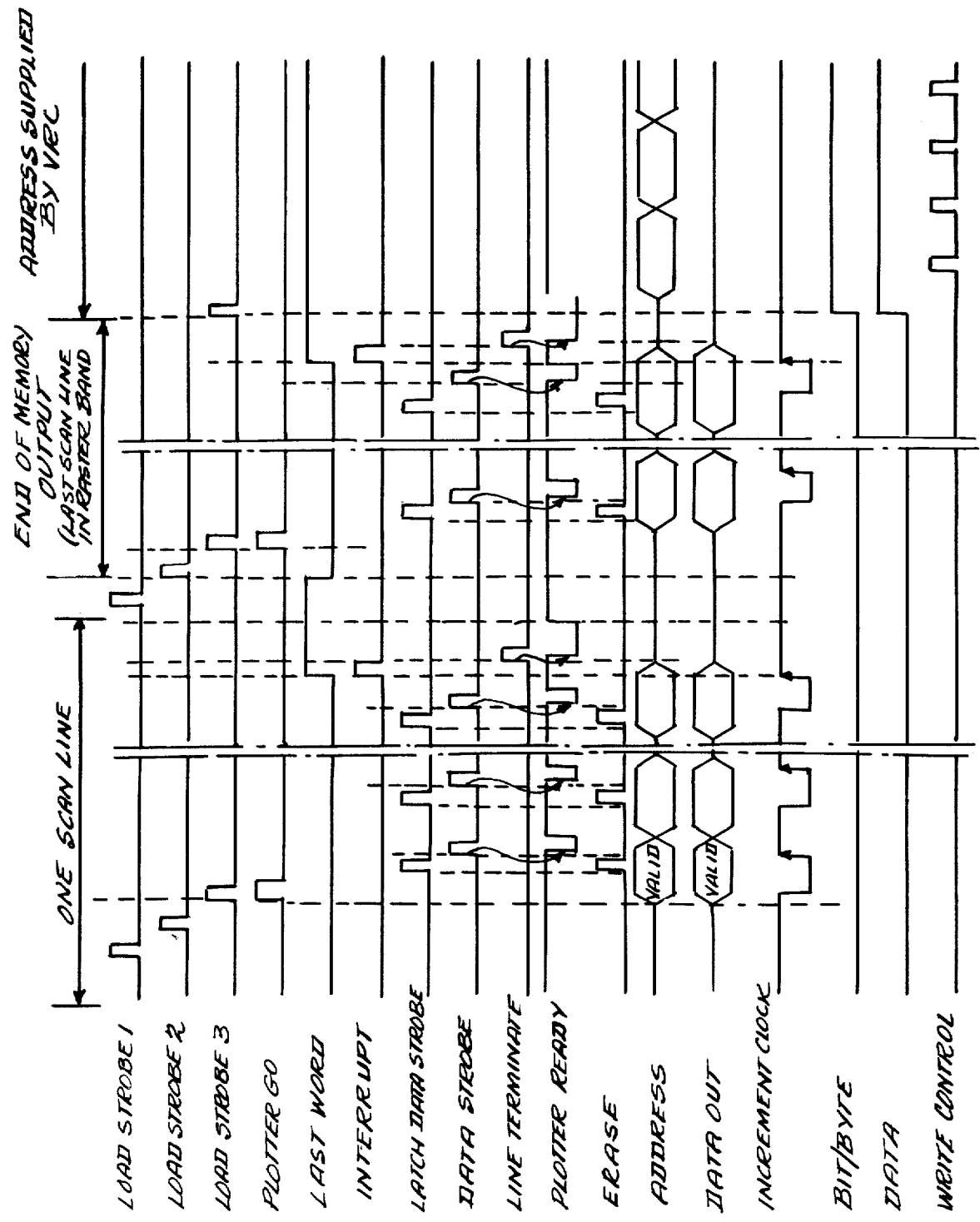
FIG. 9 is a timing diagram useful in understanding the operation of the circuitry illustrated in FIG. 8.

FIG. 9 illustrates the operation of the circuit in FIG. 8 with respect to one of the raster memories, let us say raster memory 112. During the first part of an operating cycle, data is being stored in raster memory 112, and in the second part of the cycle data is being withdrawn from raster memory 112. As illustrated in FIG. 9, for each line of data, signals are sequentially placed on the load strobe 1 line, load strobe 2 line, and the load strobe 3 line, to load counter 192 with the first address in raster memory 112 to be read out, counter 194 with the total number of bytes in one plotter line, and control register 196 with data concerning which raster memory is receiving data and with the plotter go command, respectively. With the load strobe 3 signal, the plotter go command is given to plotter control sequencer 208. At that time, a valid address signal appears at the input of raster memory 112 and valid data may be withdrawn therefrom. Soon after valid data appears at the output of raster memory 112, plotter control sequencer 208 generates a signal on the latch data strobe line to cause latch 210 to accept the data. Soon thereafter, plotter control sequencer 208 generates an erase signal to cause a "0" to be written into the same location of raster memory 112.

Next, plotter control sequencer 208 generates a data strobe signal so that plotter 216 accepts the data from latch 210. While plotter 216 is accepting the data, it is not ready to receive more data, and therefore the data strobe signal causes the plotter ready signal to go low until it has accepted the data.

At some time after the latch data strobe signal is generated for latch 210, plotter control sequencer 208 generates a rising edge on the increment clock line which causes counters 192 and 194 to be changed incrementally. Shortly thereafter, new data appears at the output of raster memory 112 representing the next byte to be output. The same sequence of a latch data strobe, erase signal and data strobe is generated by plotter control sequencer 208. This process continues until the end of the line is approached and the number stored in plotter byte counter 194 approaches "0". At the end of the line, the rising edge of the increment clock signal causes counter 194 to decrement to "0", signalling the end of the line. Counter 194 sends a last word signal back to plotter control sequencer 208 which in turn generates an interrupt signal which is sent back to housekeeping microcomputer 116. This signal indicates to housekeeping microcomputer 116 that it must set up the plotter control sequencer 208 to transfer the next line of data from raster memory 112 to plotter 216. Soon after the interrupt signal is generated, plotter control sequencer 208 generates a line terminate signal which is sent to plotter 216. In response to this, the plotter ready signal goes low as plotter 216 actually prints the line of data which it has been storing in buffers and causes the paper to advance to the next line.

Housekeeping microcomputer 116 then sends the data for counters 192 and 194 and control register 196 along with load strobes 1, 2 and 3. When counter 194 is loaded in response to load strobe 2, its contents change from "0" so that the last word signal becomes low again. Load strobe 3 causes control register 196 to generate a high plotter go pulse to initiate the next continuous transfer to plotter 216.

Housekeeping microcomputer 116 totals the number of lines that have been printed in a particular raster band. At some point, housekeeping microcomputer 116 receives an interrupt indicating the end of a raster line and housekeeping microcomputer 116 determines that all of the data in the raster band has been outputted. By this time, raster memory 112 is empty and raster memory 110 has been filled. Housekeeping microcomputer 116 places a signal on bus 190 to reverse the polarity of the bit/byte signal on line 198. At the same time, housekeeping microcomputer 116 causes bus interface control logic 126 to generate a load strobe 3 signal which causes control register 196 to accept the data on bus 190. Upon the change in level on line 198, all of the MUX's reverse gating. Thus, raster memory 112 accepts address inputs from counters 150 and 152 of VRC 106. Raster memory 112 accepts data from a high or "1" level by means of MUX 204. The write control for raster memory 112 is generated by the write control signal of comparator 108. Raster memory 110 is addressed by counter 192 via MUX 182. Data for raster memory 110 is received from a low source or a "0" source by means of MUX 200. The write control input of raster memory 110 is connected to the erase line from plotter control sequencer 208 by means of MUX 186. Data is output from raster memory 110 to latch 210 by means of MUX 206.

Each time raster memory 112 receives a write control signal from VRC 106 (specifically comparator 108) by means of MUX 188, a "1" is caused to be written in an address corresponding to the output from counters 150 and 152 of VRC 106. In this manner, data is stored in raster memory 112.

Keep in mind that raster memory 110 is performing opposite functions from raster memory 112. While raster memory 112 is outputting data to the plotter, raster memory 110 is receiving data from VRC 106 and thus has signals associated with it which look like the portion of FIG. 9 having the heading "ADDRESS SUPPLIED BY VRC". When raster memory 112 is accepting data, raster memory 110 has signals associated with it similar to the lefthand two-thirds of FIG. 9. Thus, in fact many of the signals illustrated in FIG. 9 continue in the righthand one-third of the figure for the other raster memory. Likewise, the write control signal actually is being generated by comparator 108 during the lefthand two-thirds of FIG. 9, but is being directed to the other raster memory. These portions of these signals have been eliminated for simplicity.

One interesting aspect of the preferred embodiment of the present invention can be seen in FIG. 8 at the input to MUX's 182 and 184. Specifically, the address coming from counters 150 and 152 is transferred on 17 lines whereas the address coming from DMA address counter 192 is transmitted on 14 lines. This is because data is inserted in raster memory 110 or 112 one single bit at a time, and it is necessary to address each bit in the raster memories independently. On the other hand, data is output from raster memories 110 and 112 a byte (in this case 8 bits in parallel) at a time. Thus, 14 lines are needed to address each byte in raster memory 110 or 112. The extra three lines from counters 150 and 152 are employed to address a particular bit within the byte. Line 198 has been assigned the name bit/byte mode line, because this line causes memories 110 and 112 to operate in either a bit mode (when data is being inputted to the memories) or a byte mode (when data is being output from the memories).

As noted above, the length of the raster memory can be adjusted as a function of the width of the raster memory, and thus the output plot. As can be seen in FIG. 8, the address signal to raster memories 110 and 112 from VRC 106 is sent on 17 lines. In FIG. 4, the output of x address counter 150 is indicated as having 5 lines and the output of y address counter 152 is indicated as having 14 lines. The discrepancy arises because the indications in FIG. 4 represent maximums. The total number of lines cannot exceed 17. Thus if the plot is narrow, the raster band will be long. At the extreme, the output of x address counter 150 (which holds the length dimension of the raster band) will be on 5 lines (indicating 32 lines in a raster band) and the output of y address counter 152 will be on 12 lines. If the plot is wide, the output of y address counter 152 (which holds the width dimension of the raster band) will be on 14 lines and the output of x address counter 150 will be on 3 lines (indicating 8 lines in a raster band).

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of rasterizing vectors in a predetermined space comprising the steps of:
    (a) for any one of said vectors, determining the coordinates of a plurality of points in said vector;
    (b) determining whether each of said coordinates is within said space;
    (c) retaining the coordinates favorably determined in step (b); and
    (d) repeating steps (a)–(c) for other vectors until all of said vectors have been processed.

2. A method as in claim 1 wherein step (a) includes the steps of:
    for each of said vectors, determining the coordinates of the origin of said one vector;
    loading a representation of said one vector origin first and second dimension coordinates into first and second counters, respectively; and
    incrementally changing at least one of said first and second counters so that after each said incrementation, said counters store a representation of coordinates of a point in said one vector.

3. A method as in claim 1 wherein said step (b) includes the step of comparing selected higher order bits of a representation of at least one dimension of said coordinates with a predetermined number to determine whether each of said coordinates is within said space.

4. A method as in claim 1 wherein said steps (a) and (b) include the steps of:
    determining the coordinates of the origin of said one vector;
    loading a representation of first and second dimensions of said one vector origin coordinates into first and second counters, respectively;
    repeatedly incrementally changing at least one of said first and second counters so that after each said incrementation, said counters store a representation of coordinates of a point in said one vector; and for each of said coordinates, comparing at least one dimension of said coordinates representations with a predetermined number to determine whether each of said coordinates is within said space.

5. A method as in claim 4 wherein said comparing step further comprises the step of comparing selected higher order bits of at least one dimension of said coordinates representations with a predetermined number.

6. A method of rasterizing vectors in a predetermined space comprising the steps of:
   (a) for any one of said vectors, determining the coordinates of a plurality of points in said one vector;
   (b) determining whether each of said coordinates is within a particular area;
   (c) retaining the coordinates favorably determined in said step (b);
   (d) repeating said steps (a)–(c) for other vectors until all of said vectors have been processed;
   (e) outputting said coordinates retained in said step (c); and
   (f) repeating said steps (a)–(e) for other said particular areas until the entire said space has been covered.

7. A method as in claim 6 wherein said steps (a) and (b) include the steps of:
   determining the coordinates of the origin of said one vector;
   loading a representation of first and second dimensions of said one vector origin coordinates into first and second counters, respectively;
   repeatedly incrementally changing at least one of said first and second counters so that after each said incrementation, said counters store a representation of coordinates of a point in said one vector; and
   for each of said coordinates, comparing at least one dimension of said coordinates representations with a predetermined number to determine whether each of said coordinates is within said particular area.

8. A method as in claim 7 wherein said comparing step further comprises the step of comparing selected higher order bits of at least one dimension of said coordinates representations with a predetermined number.

9. A method as in claim 1 or 6 wherein said step (a) includes the step of determining said coordinates in accordance with the Bresenham method.

10. A method of rasterizing vectors in a predetermined space comprising the steps of:
    (a) storing representations of said vectors in a first memory;
    (b) for any one of said vectors stored in said step (a), determining the coordinates of a plurality of points in said vector;
    (c) determining whether each of said coordinates is within a particular area;
    (d) storing the coordinates favorably determined in said step (c) in a second memory;
    (e) repeating said steps (b)–(d) for other vectors until all of said vectors have been processed;
    (f) outputting said coordinates stored in said step (d); and
    (g) repeating said steps (b)–(f) for other said particular areas until the entire said space has been covered.

11. A method of rasterizing vectors in a predetermined space comprising the steps of:
    (a) for any one of said vectors, determining the coordinates of a plurality of points in said vector;
    (b) comparing selected higher order bits of binary representations of at least one dimension of each of said coordinates with a predetermined number to determine whether said coordinates are within a particular area;
    (c) retaining the coordinates favorably compared in said step (b);
    (d) repeating said steps (a)–(c) for other vectors until all of said vectors have been processed;
    (e) outputting said coordinates retained in said step (c); and
    (f) repeating said steps (a)–(e) for other said particular areas until the entire said space has been covered.

12. A method of rasterizing vectors in a predetermined space comprising the steps of:
    (a) for any one of said vectors, determining the coordinates of the origin of said one vector;
    (b) loading a representation of two dimensions of said one vector origin coordinates into first and second counters, respectively;
    (c) repeatedly incrementally changing at least one said first and second counters so that after each said incrementation, said counters store a representation of coordinates of a point in said one vector;
    (d) determining whether each of said coordinates representations is within a particular area;
    (e) retaining said coordinates which are favorably determined in said step (d);
    (f) repeating said steps (a)–(e) for other vectors until all of said vectors have been processed;
    (g) transferring all data retained in said step (e) to an output device;
    (h) repeating said steps (a)–(g) for other said particular areas until the entire said space has been covered.

13. A method of rasterizing vectors in a predetermined space comprising the steps of:
    (a) storing representations of said vectors in a first memory;
    (b) for any one of said vectors stored in said step (a), determining the coordinates of the origin of said one vector;
    (c) loading a representation of two dimensions of said one vector origin coordinates into first and second counters, respectively;
    (d) repeatedly incrementally changing at least one of said first and second counters so that after each said incrementation, said counters store a representation of coordinates of a point in said one vector;
    (e) for each of said coordinates, comparing at least one of said dimensions of said coordinates representations with a predetermined number to determine whether each of said coordinates is within a particular area;
    (f) storing bits in a second memory at locations related to said coordinates which compared favorably in said step (e);
    (g) repeating said steps (b)–(f) for other vectors stored in said step (a) until all of said vectors stored in said step (a) have been processed;
    (h) transferring all data stored in said step (f) to an output device; and
    (i) repeating said steps (b)–(h) for other said particular areas until the entire said space has been covered.

14. A method of rasterizing vectors in a predetermined space comprising the steps of:
   (a) determining all vectors which have at least a portion in a particular area of said space;
   (b) for any one of the vectors determined in said step (a) determining the coordinates of a plurality of points of said vector;
   (c) determining whether each of said coordinates is within said particular area;
   (d) retaining the coordinates favorably determined in said step (c);
   (e) repeating said steps (b)–(d) for other vectors until all of said vectors determined in said step (a) have been processed;
   (f) outputting said coordinates retained in said step (d); and
   (g) repeating said steps (a)–(f) for other said particular areas until the entire said space has been covered.

15. A method as in claim 14 wherein said steps (b) and (c) include the steps of:
   determining the coordinates of the origin of said one vector;
   loading a representation of said first and second dimensions of said one vector origin coordinates into first and second counters, respectively;
   incrementally changing at least one of said first and second counters so that after each said incrementation, said counters store a representation of coordinates of a point in said one vector; and
   for each of said coordinates, comparing at least one dimension of said coordinates representations with a predetermined number to determine whether each of said coordinates is within said particular area.

16. A method as in claim 15 wherein said comparing step further comprises the step of comparing selected higher order bits of at least one dimension of said coordinates representations with a predetermined number.

17. A method as in claim 6 or 14 wherein said particular areas extend the entire distance of one dimension of said space.

18. A method of rasterizing vectors in a predetermined space comprising the steps of:
   (a) determining all vectors which have at least a portion in a particular area of said space;
   (b) storing representations of said vectors determined in said step (a) in a first memory;
   (c) for any one of the vectors stored in said step (b), determining the coordinates of a plurality of points of said vector;
   (d) determining whether each of said coordinates is within said particular area;
   (e) storing the coordinates favorably determined in said step (d) in a second memory;
   (f) repeating said steps (c)–(e) for other vectors until all of said vectors stored in said step (b) have been processed;
   (g) outputting said coordinates stored in said step (e); and
   (h) repeating said steps (a)–(g) for other said particular areas until the entire said space has been covered.

19. A method as in claim 18 wherein said step (d) includes the step of comparing selected higher order bits of a representation of at least one dimension of said coordinates with a predetermined number to determine whether each of said coordinates is within said particular area.

20. A method of rasterizing vectors in a predetermined space comprising the steps of:
   (a) determining all vectors which have at least a portion in a particular area of said space;
   (b) for any one of the vectors determined in said step (a), determining the coordinates of a plurality of points of said vector;
   (c) comparing selected higher order bits of binary representations of at least one dimension of each of said coordinates with a predetermined number to determine whether said coordinates are within said particular area;
   (d) retaining the coordinates favorably compared in said step (c);
   (e) repeating said steps (b)–(d) for other vectors until all of said vectors determined in said step (a) have been processed;
   (f) outputting said coordinates retained in said step (d); and
   (g) repeating said steps (a)–(f) for other said particular areas until the entire said space has been covered.

21. A method as in claim 1, 11 or 20 wherein:
   said method further comprises the step of storing said vectors in a first memory prior to said step (a); and
   said retaining step further comprises the step of storing said coordinates in a second memory.

22. A method of rasterizing vectors in a predetermined space comprising the steps of:
   (a) determining all vectors which have at least a portion in a particular area of said space;
   (b) for any one of said vectors determined in said step (a), determining the coordinates of the origin of said one vector;
   (c) loading a representation of two dimensions of said one vector origin coordinates into first and second counters, respectively;
   (d) repeatedyl incrementally changing at least one of said first and second counters so that after each said incrementation, said counters store a representation of coordinates of a point in said one vector;
   (e) determining whether each of said coordinates representations is within said particular area;
   (f) retaining said coordinates which are favorably determined in said step (e);
   (g) repeating said steps (b)–(f) for other vectors determined in said step (a) until all of said vectors determined in said step (a) have been processed;
   (h) transferring all data retained in said step (f) to an output device; and
   (i) repeating said steps (a)–(h) for other said particular areas until the entire said space has been covered.

23. A method of rasterizing vectors in a predetermined space comprising the steps of:
   (a) determining all vectors which have at least a portion in a particular area of said space;
   (b) storing representations of said vectors determined in said step (a) in a first memory;
   (c) for any one of said vectors stored in said step (b), determining the coordinates of the origin of said one vector;
   (d) loading a representation of two dimensions of said one vector origin coordinates into first and second counters, respectively;
   (e) repeatedly incrementally changing at least one of said first and second counters so that after each said incrementation, said counters store a representation of coordinates of a point in said one vector;

(f) comparing at least one dimension of each of said coordinates representations with a predetermined number to determine whether each of said coordinates is within said particular area;

(g) storing bits in a second memory at locations related to said coordinates which compared favorably in said step (f);

(h) repeating said steps (c)–(g) for other vectors stored in said step (b) until all of said vectors stored in said step (b) have been processed;

(i) transferring all data stored in said step (g) to an output device; and (j) repeating said steps (a)–(i) for other said particular areas until the entire said space has been covered.

24. A method of rasterizing vectors in a predetermined space comprising the steps of:

(a) determining all vectors which have at least a portion in a first particular area of said space;

(b) for any one of the vectors determined in said step (a), determining the coordinates of a plurality of points in said vector;

(c) determining whether each of said coordinates is within a second particular area within said first particular area;

(d) retaining the coordinates favorably determined in said step (c);

(e) repeating said steps (b)–(d) for other vectors until all of said vectors determined in said step (a) have been processed;

(f) outputting said coordinates retained in said step (d);

(g) repeating said steps (b)–(f) for other said second particular areas until the entire said first particular area has been covered; and (h) repeating said steps (a)–(g) for other said first particular areas until the entire said space has been covered.

25. A method as in claim 24 wherein said steps (b) and (c) include the steps of:

determining the coordinates of the origin of said one vector;

loading a representation of first and second dimensions of said one vector origin coordinates into first and second counters, respectively;

incrementally changing at least one of said first and second counters so that after each said incrementation, said counters store a representation of coordinates of a point in said one vector; and for each of said coordinates, comparing at least one dimension of said coordinates representations with a predetermined number to determine whether each of said coordinates is within said second particular area.

26. A method as in claim 25 wherein said comparing step further comprises the step of comparing selected higher order bits of at least one dimension of said coordinates representations with a predetermined number.

27. A method as in claim 24 wherein said step (b) includes the step of determining said coordinates in accordance with the Bresenham method.

28. A method of rasterizing vectors in a predetermined space comprising the steps of:

(a) determining all vectors which have at least a portion in a first particular area of said space;

(b) storing representations of said vectors determined in said step (a) in a first memory;

(c) for any one of the vectors determined in said step (a), determining the coordinates of a plurality of points in said vector;

(d) determining whether each of said coordinates are within a second particular area within said first particular area;

(e) storing the coordinates favorably determined in said step (d) in a second memory;

(f) repeating said steps (c)–(e) for other vectors until all of said vectors determined in said step (a) have been processed;

(g) outputting said coordinates stored in said step (e);

(h) repeating said steps (c)–(g) for other said second particular areas until the entire said first particular area has been covered; and (i) repeating said steps (a)–(h) for other said first particular areas until the entire said space has been covered.

29. A method as in claim 28 wherein said step (d) includes the step of comparing selected higher order bits of a representation of at least one dimension of said coordinates with a predetermined number to determine whether each of said coordinates is within said second particular area.

30. A method as in claim 28 wherein:

said first and second memories each includes first and second portions; and said method further comprises the steps of:

loading vectors into said first memory first portion while vectors are being read out from said first memory second portion until said first memory first portion is completely loaded with vectors and all of the vectors in said first memory second portion have been read out and then loading vectors into said first memory second portion while vectors are being read out of said first memory first portion, and loading coordinates into said second memory first portion while reading out coordinates from said second memory second portion until said second memory first portion is entirely loaded with coordinates and all of said coordinates in said second memory second portion are read out, and then loading coordinates into said second memory second portion while reading out coordinates from said second memory first portion.

31. A method of rasterizing vectors in a predetermined space comprising the steps of:

(a) determining all vectors which have at least a portion in a first particular area of said space;

(b) for any one of the vectors determined in said step (a), determining the coordinates of a plurality of points in said vector;

(c) comparing selected higher order bits of binary representations of at least one dimension of each of said coordinates with a predetermined number to determine whether said coordinates are within a second particular area within said first particular area;

(d) retaining the coordinates favorably determined in said step (c);

(e) repeating said steps (b)–(d) for other vectors until all of said vectors determined in said step (a) have been processed;

(f) outputting said coordinates retained in said step (d);

(g) repeating said steps (b)–(f) for other said second particular areas until the entire said first particular area has been covered; and (h) repeating said steps (a)–(g) for other said first predetermined areas until the entire said space has been covered.

32. A method of rasterizing vectors in a predetermined space comprising the steps of:

(a) determining all vectors which have at least a portion in a first particular area of said space;

(b) for any one of the vectors determined in said step (a), determining the coordinates of the origin of said one vector;

(c) loading representations of first and second dimensions of said one vector origin coordinates into first and second counters, respectively;

(d) repeatedly incrementally changing at least one of said fist and second counters so that after each said incrementation, said counters store a representation of coordinates of a point in said one vector;

(e) determining whether each of said coordinates is within a second particular area within said first particular area;

(f) retaining the coordinates favorably determined in said step (e);

(g) repeating said steps (b)–(f) for other vectors until all of said vectors determined in said step (a) have been processed;

(h) outputting said coordinates retained in said step (f);

(i) repeating said steps (b)–(h) for other said second particular areas until the entire said first particular area has been covered; and (j) repeating said steps (a)–(i) for other said first particular areas until the entire said space has been covered.

33. A method of rasterizing vectors in a predetermined space comprising the steps of:

(a) determining all vectors which have at least a portion in a first particular area of said space;

(b) storing representations of said vectors determined in said step (a) in a first memory;

(c) for any one of said vectors stored in said step (b), determining the coordinates of the origin of said one vector;

(d) loading a representation of said one vector origin first and second dimension coordinates into first and second counters, respectively;

(e) repeatedly incrementally changing at least one of said first and second counters so that after each said incrementation, said counters store a representation of coordinates of a point in said one vector;

(f) determining whether each of said coordinates is within a second particular area within said first particular area;

(g) storing bits in a second memory at locations related to said coordinates which were favorably determined in said step (f);

(h) repeating said steps (c)–(g) for other vectors stored in said step (b) until all of said vectors stored in said step (b) have been processed;

(i) transferring all data stored in said step (g) to an output device;

(j) repeating said steps (c)–(i) for other said second particular areas until the entire said first particular area has been covered; and (k) repeating said steps (a)–(j) for other said first particular areas until the entire said space has been covered.

34. A method as in claim 10 or 33 further comprising the steps of:

loading vectors into a first portion of said first memory while vectors are being read out from a second portion of said first memory until said first memory first portion is completely loaded with vectors and all of the vectors in said first memory second portion have been read out and then loading vectors into said first memory second portion while vectors are being read out of said first memory first portion; and loading coordinates into a first portion of said second memory while reading out coordinates from a second portion of said second memory until said second memory first portion is entirely loaded with coordinates and all of said coordinates in said second memory second portion are read out, and then loading coordinates into said second memory second portion while reading out coordinates from said second memory first portion.

35. A method of rasterizing vectors in a predetermined space comprising the steps of:

(a) determining all vectors which have at least a portion in a first particular area of said space;

(b) storing representations of said vectors determined in said step (a) in a first memory;

(c) for any one of said vectors stored in said step (b), determining the coordinates of the origin of said one vector;

(d) loading a representation of two dimensions of said one vector origin coordinates into first and second counters, respectively;

(e) repeatedly incrementally changing at least one of said first and second counters so that after each said incrementation, said counters store a representation of coordinates of a point in said one vector;

(f) comparing at least one dimension of each of said coordinates representations with a predetermined number to determine whether each of said coordinates is within a second particular area within said first particular area;

(g) storing bits in a second memory at locations related to said coordinates which compared favorably in said step (f);

(h) repeating said steps (c)–(g) for other vectors stored in said step (b) until all of said vectors stored in said step (b) have been processed;

(i) transferring all data stored in said step (g) to an output device;

(j) repeating said steps (c)–(i) for other said second particular areas until the entire said first particular area has been covered; and (k) repeating said steps (a)–(j) for other said first particular areas until the entire said space has been covered.

36. A method of rasterizing vectors in a predetermined space comprising the steps of:

(a) determining all vectors which have at least a portion in a first particular area of said space;

(b) storing representations of said vectors determined in said step (a) in a first memory;

(c) for any one of said vectors stored in said step (b), determining the coordinates of the origin of and the change in two dimensions from the origin to the end point of said one vector;

(d) loading a representation of said one vector origin coordinates into said first and second counters corresponding to said two dimensions, respectively;

(e) repeatedly incrementally changing at least one of said first and second counters in accordance with the Bresenham method, so that after each said incrementation, said counters store a representation of coordinates of a point in said one vector;

(f) comparing selected higher order bits of at least one dimension of each of said coordinates representations with a particular number to determine whether each of said coordinates is within a second particular area within said first particular area;

(g) storing bits in a second memory at locations related to said coordinates which compared favorably in said step (f);

(h) repeating said steps (c)–(g) for other vectors stored in said step (b) until all of said vectors stored in said step (b) have been processed;

(i) transferring all data stored in said step (g) to an output device;

(j) repeating said steps (c)–(i) for other said second particular areas until the entire said first particular area has been covered; and (k) repeating said steps (a)–(j) for other said first predetermined areas until the entire said space has been covered.

37. A method as in claim 24 or 36 wherein said first particular areas and said second particular areas extend the entire distance of one dimension of said space.

38. A method of rasterizing vectors in a predetermined space comprising the steps of:

(a) determining all vectors which have at least a portion in a first particular area of said space;

(b) storing representations of said vectors determined in said step (a) in a first memory, said first memory having two portions;

(c) for any one of said vectors stored in said step (b), determining the coordinates of the origin of and the change in two dimensions from the origin to the end point of said one vector;

(d) loading a representation of two dimensions of said one vector origin coordinates into first and second counters corresponding to said two dimensions;

(e) repeatedly incrementally changing at least one of said first and second counters in accordance with the Bresenham method, so that after each said incrementation, said counters store a representation of coordinates of a point in said one vector;

(f) comparing selected higher order bits of at least one dimension of each of said coordinates representations with a predetermined number to determine whether each of said coordinates is within a second particular area within said first particular area;

(g) storing bits in a second memory at locations related to said coordinates which compared favorably in said step (f), said second memory having two portions;

(h) repeating said steps (c)–(g) for other vectors stored in said step (b) until all of said vectors stored in said step (b) have been processed;

(i) transferring all data stored in said step (g) to an output device;

(j) repeating said steps (c)–(h) simultaneously with said step (i) for other said second particular areas until the entire said first particular area has been covered, said step (g) occurring in one said second memory portion while said step (i) occurs in another said second memory portion, said steps (g) and (i) reversing with respect to said portions upon each completion of said steps (h) and (i); and (k) repeating said steps (a)–(b) simultaneously with said steps (c)–(j) for other said first particular areas until the entire said space has been covered, said step (b) occurring in one said first memory portion while data for said step (c) is obtained in another said first memory portion, said steps (b) and (c) reversing with respect to said first memory portions upon each completion of said step (b) and said steps (c)–(j).

39. Apparatus for rasterizing vectors in a predetermined space comprising:

means for serially selecting each of said vectors until all of said vectors have been selected;

first means, coupled to said selecting means, for determining the coordinates of a plurality of points in each of said selected vectors;

second means, coupled to said first determining means, for determining whether each of said coordinates is within said space; and means, coupled to said second determining means, for retaining said coordinates favorably determined by said second determining means.

40. Apparatus as in claim 39 wherein:

said apparatus further comprises vector memory means for storing said vectors, said selecting means being coupled to said vector memory means; and said means for retaining includes raster memory means for storing said coordinates favorably determined in said second determining means.

41. Apparatus as in claim 39 wherein said first determining means further comprises:

a first counter;

a second counter;

means, coupled to said first counter, for loading a first dimension coordinate of the origin of said selected vector into said first counter;

means, coupled to said second counter, for loading a second dimension coordinate of the origin of said selected vector into said second counter; and means, coupled to said first and second counters, for incrementally changing at least one of said first and second counters so that the output of said first and second counters after each incrementation represents the coordinates of a point in said selected vector.

42. Apparatus as in claim 39 wherein said first and second determining means further comprises:

a first counter;

a second counter;

means, coupled to said first counter, for loading a first dimension coordinate of the origin of said selected vector into said first counter;

means, coupled to said second counter, for loading a second dimension coordinate of the origin of said selected vector into said second counter;

means, coupled to said first and second counters, for incrementally changing at least one of said first and second counters so that the output of said first and second counters represents coordinates of points in said selected vector; and means, coupled to at least one of said first and second counters, for comparing at least one of said first and second counter outputs with a predetermined number to determine if said coordinates at said first and second counter outputs are within said space.

43. Apparatus as in claim 39 wherein said first and second determining means further comprises:
   a first counter;
   a second counter;
   means, coupled to said first counter, for loading a first dimension coordinate of the origin of a selected vector selected by said selecting means into said first counter;
   means, coupled to said second counter, for loading a second dimension coordinate of the origin of said selected vector into said second counter;
   means, coupled to said first and second counters, for incrementally changing at least one of said first and second counters so that the output of said first and second counters represents coordinates of points in said selected vector; and
   means, coupled to at least one of said first and and second counters, for comparing selected higher order bits of at least one of said first and second counter outputs with a predetermined number to determine if said coordinates at said first and second counter outputs are within said space.

44. Apparatus for rasterizing vectors in a predetermined space comprising:
   first means for serially selecting each of a plurality of particular areas until all of said space has been covered;
   second means for serially selecting each of said vectors until all of said vectors have been selected for each of said particular areas;
   first means, coupled to said second selecting means, for determining the coordinates of a plurality of points in each of said selected vectors;
   second means, coupled to said first selecting means and said first determining means, for determining whether each of said coordinates is within said selected particular area;
   means, coupled to said second determining means, for retaining said coordinates favorably determined by said second determining means; and
   means, coupled to said retaining means, for outputting said coordinates retained by said retaining means after said second selecting means has selected all of said vectors for one of said particular areas.

45. Apparatus for rasterizing vectors in a predetermined space comprising:
   vector memory means for storing representations of said vectors;
   first means for serially selecting each of a plurality of particular areas until all of said space has been covered;
   second means, coupled to said vector memory means, for serially selecting each of said vectors stored in said vector memory means until all of said vectors have been selected for each of said particular areas;
   first means, coupled to said second selecting means, for determining the coordinates of a plurality of points in each of said selected vectors;
   second means, coupled to said first selecting means and said first determining means, for determining whether each of said coordinates are within said selected particular area;
   raster memory means, coupled to said second determining means, for storing said coordinates favorably determined by said second determining means; and
   means, coupled to said raster memory means, for outputting said coordinates stored in said raster memory means after said second selecting means has selected all of said vectors for one of said particular areas.

46. Apparatus as in claim 45 wherein:
   said raster memory means includes first and second portions; and
   said apparatus further comprises means, coupled to said raster memory means, for first directing coordinates from said first determining means in response to a favorable determination to said raster memory means first portion while said outputting means obtains coordinates from said raster memory means second portion until all vectors in said vector memory means have been processed by said second selecting means and said first determining means and said outputting means has output all of said vectors in said raster memory means second portion, and then directing coordinates from said first determining means in response to a favorable determination to said raster memory means second portion while said outputting means obtains coordinates from said raster memory means first portion.

47. Apparatus for rasterizing vectors in a predetermined space comprising:
   first means for serially selecting each of a plurality of particular areas until all of said space has been covered;
   second means for serially selecting each of said vectors until all of said vectors have been selected for each of said particular areas;
   means, coupled to said second selecting means, for determining the coordinates of a plurality of points in each of said selected vectors;
   means, coupled to said first selecting means and said determining means, for comparing higher order bits of binary representations of at least one dimension of said coordinates with a predetermined number to determine whether said coordinates are within said selected particular area;
   means, coupled to said comparing means, for retaining said coordinates favorably compared by said comparing means; and
   means, coupled to said retaining means, for outputting said coordinates retained by said retaining means after said second selecting means has selected all of said vectors for one of said particular areas.

48. Apparatus for rasterizing vectors in a predetermined space comprising:
   first means for serially selecting each of a plurality of particular areas until all of said space has been covered;
   second means for serially selecting each of said vectors until all of said vectors have been selected for each of said particular areas;
   a first counter;
   a second counter;
   means, coupled to said second selecting means and said first counter, for loading a first dimension coordinate of the origin of said selected vector into said first counter;
   means, coupled to said second selecting means and said second counter, for loading a second dimension coordinate of the origin of said selected vector into said second counter;

means, coupled to said first and second counters, for incrementally changing at least one of said first and second counters so that the output of said first and second counters represents coordinates of points in said selected vector;

means, coupled to said first selecting means and said first and second counters, for determining whether said coordinates at outputs of said first and second counters are within said selected particular area;

means, coupled to said determining means and said first and second counters, for retaining said first and second counter outputs in response to a favorable determination; and means, coupled to said retaining means, for outputting said coordinates retained by said retaining means after all of said vectors have been selected for one of said particular areas.

49. Apparatus for rasterizing vectors in a predetermined space comprising:

vector memory means for storing said vectors;

first means for serially selecting each of a plurality of particular areas until all of said space has been covered;

second means, coupled to said vector memory means, for serially selecting each of said vectors stored in said vector memory means until all of said vectors have been selected for each of said particular areas;

a first counter;

a second counter;

means, coupled to said second selecting means and said first counter, for loading a first dimension coordinate of the origin of said selected vector into said first counter;

means, coupled to said second selecting means and said second counter, for loading a second dimension coordinate of the origin of said selected vector into said second counter;

means, coupled to said first and second counters, for incrementally changing at least one of said first and second counters so that the output of said first and second counters represents coordinates of points in said selected vector;

means, coupled to said first selecting means and said at least one of said first and second counters, for comparing outputs of at least one of said first and second counters with a predetermined number to determine if said coordinates at said first and second counter outputs are within said selected particular area;

raster memory means, coupled to said comparing means and said first and second counters, for storing said first and second counter outputs in response to a favorable comparison; and means, coupled to said raster memory means, for outputting the contents of said raster memory means after all vectors stored in said vector memory means have been selected for one of said particular areas.

50. Apparatus for rasterizing vectors in a predetermined space comprising:

means for identifying all vectors which have at least a portion in a selected one of a plurality of particular areas within said space and for serially selecting each of said particular areas until all of said space has been covered;

means, coupled to said identifying and selecting means, for serially selecting each of said vectors identified by said identifying and selecting means until all of said vectors in said selected particular area have been selected;

first means, coupled to said selecting means for determining the coordinates of a plurality of points in each of said selected vectors;

second means, coupled to said first determining means, for determining whether each of said coordinates is within said selected particular area;

means, coupled to said second determining means, for retaining said coordinates favorably determined in said second determining means; and means, coupled to said retaining means, for outputting said coordinates retained by said retaining means after said second selecting means has selected all of said identified vectors for one of said particular areas.

51. Apparatus as in claim 44 or 50 wherein said particular areas have one dimension the same as one dimension of said space.

52. Apparatus as in claim 44 or 50 wherein said first and second determining means further comprises:

a first counter;

a second counter;

means, coupled to said vector selecting means and said first counter, for loading a first dimension coordinate of the origin of said selected vector into said first counter;

means, coupled to said vector selecting means and said second counter, for loading a second dimension coordinate of the origin of said selected vector into said second counter;

means, coupled to said first and second counters, for incrementally changing at least one of said first and second counters so that the output of said first and second counters represents coordinates of points in said selected vector; and means, coupled to at least one of said counters, for comparing at least one of said first and second counter outputs with a predetermined number to determine if said coordinates at said first and second counter outputs are within said selected particular area.

53. Apparatus as in claim 44 or 50 wherein said first and second determining means further comprises:

a first counter;

a second counter;

means, coupled to said vector selecting means and said first counter, for loading a first dimension coordinate of the origin of a selected vector selected by said vector selecting means into said first counter;

means, coupled to said vector selecting means and said second counter, for loading a second dimension coordinate of the origin of said selected vector into said second counter;

means, coupled to said first and second counters, for incrementally changing at least one of said first and second counters so that the output of said first and second counters represents coordinates of points in said selected vector; and means, coupled to at least one of said first and second counters, for comparing selected higher order bits of at least one of said first and second counter outputs with a predetermined number to determine if said coordinates at said first and second counter outputs are within said selected particular area.

54. Apparatus for rasterizing vectors in a predetermined space comprising:
    means for identifying groups of vectors, each of said groups including all vectors which have at least a portion in a selected one of a plurality of particular areas within said space;
    vector memory means, coupled to said identifying means, for serially storing representations of each of said groups of vectors until said vectors in all of said particular areas have been stored;
    means, coupled to said vector memory means, for serially selecting each of said vectors identified by said identifying means and stored in said vector memory means until all of said vectors in each of said selected particular areas have been selected;
    first means, coupled to said selecting means, for determining the coordinates of a plurality of points in each of said selected vectors;
    second means, coupled to said first determining means, for determining whether each of said coordinates is within said selected particular area;
    raster memory means, coupled to said second determining means, for storing said coordinates favorably determined by said second determining means; and
    means, coupled to said raster memory means, for outputting said coordinates stored in said raster memory means after said second selecting means has selected all of said identified vectors for one of said particular areas.

55. Apparatus as in claim 45 or 54 wherein said second determining means includes means for comparing higher order bits of binary representations of at least one dimension of said coordinates with a predetermined number to determine if said coordinates are within said selected particular area.

56. Apparatus for rasterizing vectors in a predetermined space comprising:
    means for identifying all vectors which have at least a portion in a selected one of a plurality of particular areas within said space and for serially selecting each of said particular areas until all of said space has been covered;
    means, responsive to said identifying and selecting means, for serially selecting each of said vectors identified by said identifying and selecting means until all of said vectors in said selected particular area have been selected;
    means, coupled to said vector selecting means, for determining the coordinates of a plurality of points in each of said selected vectors;
    means, coupled to said determining means, for comparing higher order bits of a binary representation of at least one dimension of said coordinates with a predetermined number to determine whether said coordinates are within said selected particular area;
    means, coupled to said comparing means, for retaining said coordinates favorably compared in said comparing means; and
    means, coupled to said retaining means, for outputting said coordinates retained by said retaining means after said second selecting means has selected all of said identified vectors for one of said particular areas.

57. Apparatus as in claim 56 further comprising:
    vector memory means, coupled to said identifying means, for serially storing all of said vectors in each of said particular areas, said vector selecting means being responsive to said vector memory means; and
    said means for retaining includes raster memory means for storing said coordinates retained by said retaining means.

58. Apparatus for rasterizing vectors in a predetermined space comprising:
    means for identifying all vectors which have at least a portion in a corresponding one of a plurality of particular areas within said space and for serially selecting each of said particular areas until all of said space has been covered;
    means, coupled to said identifying and selecting means, for serially selecting each of said vectors in said selected predetermined area until all of said vectors have been selected;
    a first counter;
    a second counter;
    means, coupled to said vector selecting means and said first counter, for loading a first dimension coordinate of the origin of said selected vector into said first counter;
    means, coupled to said vector selecting means and said second counter, for loading a second dimension coordinate of the origin of said selected vector into said second counter;
    means, coupled to said first and second counters, for incrementally changing at least one of said first and second counters so that the output of said first and second counters represents coordinates of points in said selected vector;
    means, coupled to said first and second counters, for determining whether said coordinates at said first and second counter outputs are within said selected particular area;
    means, coupled to said determining means and said first and second counters, for retaining said first and second counter outputs in response to a favorable determination; and
    means, coupled to said retaining means, for outputting said coordinates retained in said retaining means after said second selecting means has selected all of said vectors for one of said particular areas.

59. Apparatus for rasterizing vectors in a predetermined space comprising:
    means for identifying groups of vectors, each of said groups including all vectors which have at least a portion in a selected one of a plurality of particular areas within said space;
    vector memory means, coupled to said identifying means, for serially storing representations of each of said groups of vectors until said vectors in all of said particular areas have been stored;
    means, coupled to said vector memory means, for serially selecting each of said vectors stored in said vector memory means until all of said vectors in said selected particular area have been selected;
    a first counter;
    a second counter;
    means, coupled to said selecting means and said first counter, for loading a first dimension coordinate of the origin of said selected vector into said first counter;
    means, coupled to said selecting means and said second counter, for loading a second dimension coordinate of the origin of said selected vector into said second counter;

means, coupled to said first and second counters, for incrementally changing at least one of said first and second counters so that the output of said first and second counters represents coordinates of points in said selected vector;

means, coupled to at least one of said first and second counters, for comparing outputs of at least one of said first and second counters with a predetermined number to determine if said coordinates at said first and second counter outputs are within said selected particular area;

raster memory means, coupled to said comparing means and said first and second counters, for storing said first and second counter outputs in response to a favorable comparison; and means, coupled to said raster memory means, for outputting the contents of said raster memory means after all vectors stored in said vector memory means have been selected for one of said particular areas.

60. Apparatus for rasterizing vectors in a predetermined space comprising:

means for identifying all vectors which have at least a portion in a selected one of a plurality of first particular areas within said space and for serially selecting each of said first particular areas until all of said space has been covered;

first means for serially selecting each of a plurality of second particular areas within said selected first particular area until the entire said selected first particular area has been covered;

second means for serially selecting each of said vectors identified by said identifying and selecting means until all of said vectors in said selected first particular area have been selected for each second particular area;

first means, coupled to said second selecting means, for determining the coordinates of a plurality of points in each of said selected vectors;

second means, coupled to said first determining means, for determining whether each of said coordinates is within said selected second particular area;

means, coupled to said second determining means, for retaining said coordinates favorably determined by said second determining means; and means, coupled to said retaining means, for outputting said coordinates retained by said retaining means after said third selecting means has selected all of said identified vectors for one of said second particular areas.

61. Apparatus as in claim 60 wherein said first and second determining means further comprises:

a first counter;
a second counter;
means, coupled to said second selecting means and said first counter, for loading a first dimension coordinate of the origin of said selected vector into said first counter;

means, coupled to said second selecting means and said second counter, for loading a second dimension coordinate of the origin of said selected vector into said second counter;

means, coupled to said first and second counters, for incrementally changing at least one of said first and second counters so that the output of said first and second counters represents coordinates of points in said selected vector; and means, coupled to at least one of said first and second counters, for comparing at least one of said first and second counter outputs with a predetermined number to determine if said coordinates at said first and second counter outputs are within said selected second particular area.

62. Apparatus as in claim 60 wherein said first and second determining means further comprises:

a first counter;
a second counter;
means, coupled to said second selecting means and said first counter, for loading a first dimension coordinate of the origin of a selected vector selected by said first selecting means into said first counter;

means, coupled to said second selecting means and said second counter, for loading a second dimension coordinate of the origin of said selected vector into said second counter;

means, coupled to said first and second counters, for incrementally changing at least one of said first and second counters so that the output of said first and second counters represents coordinates of points in said selected vector; and means, coupled to at least one of said first and second counters, for comparing selected higher order bits of at least one of said first and second counter outputs with a predetermined number to determine if said coordinates at said first and second counter outputs are within said selected second particular area.

63. Apparatus as in claim 39, 44 or 60 wherein said first determining means includes means for determining the coordinates of a plurality of points in each of said selected vectors in accordance with the Bresenham method.

64. Apparatus as in claim 63 wherein said first determining means further comprises:

a first multiplexer having a first input responsive to the change in one dimension between ends of said selected vector;

a second multiplexer having a first input responsive to the change in another dimension between ends of said selected vector;

a first register coupled to an output of said first multiplexer;

a second register coupled to an output of said second multiplexer;

means, coupled to said first register and said second multiplexer, for transmitting the output of said first register to a second input of said second multiplexer;

means, coupled to said second register and said first multiplexer, for transmitting the output of said second register to a second input of said first multiplexer;

an AND gate having a first input coupled to the output of said second register and a second input;

first arithmetic means having a first input coupled to the output of said first register and a second input coupled to the output of said AND gate, said arithmetic means producing an output related to the difference between said first input and said second input, the most significant bit of an output of said arithmetic means controlling said first and second multiplexers;

second arithmetic means having a first input coupled to said first arithmetic means output and a second input, said second arithmetic means producing an output related to the sum of said first and second inputs, said second input of said AND gate and said second determining means being coupled to said second arithmetic means output; and an accumulator coupled to the output of said second arithmetic means, said second arithmetic means second input being coupled to the output of said accumulator.

65. Apparatus for rasterizing vectors in a predetermined space comprising:

means for identifying groups of vectors, each of said groups including all vectors which have at least a portion in a selected one of a plurality of first particular areas within said space;

vector memory means, coupled to said identifying means, for serially storing representations of each of said groups of vectors until said vectors in all of said first particular areas have been stored;

first means for serially selecting each of a plurality of second particular areas within said selected first particular area until the entire said selected first particular area has been covered;

second means, coupled to said vector memory means, for serially selecting each of said vectors stored in said vector memory means until all of said vectors in said selected first particular area have been selected for each said second particular area;

first means, coupled to said second selecting means, for determining the coordinates of a plurality of points in each of said selected vectors;

second means, coupled to said first determining means and said first selecting means, for determining whether each of said coordinates are within said selected second particular areas;

raster memory means, coupled to said second determining means, for storing representations of said coordinates favorably determined in said second determining means; and means, coupled to said raster memory means, for outputting said coordinates stored in said raster memory means after said second selecting means has selected all of said identified vectors for one of said second particular areas.

66. Apparatus as in claim 54 or 65 wherein said second determining means includes means for comparing higher order bits of binary representations of at least one dimension of said coordinates with a predetermined number to determine if said coordinates are within said selected second particular area.

67. Apparatus as in claim 65 wherein:

said raster memory means and said vector memory means each includes first and second portions; and said apparatus further comprises:

means, coupled to said vector memory means, for first directing vectors from said identifying means to said vector memory means first portion while said first selecting means selects vectors from said vector memory means second portion until said identifying means has identified all vectors in one of said first particular areas and said first selecting means has selected all of said vectors in said vector memory means second portion, and then directing vectors from said identifying means to said vector memory means second portion while said first selecting means selects vectors from said vector memory means first portion, and means, coupled to said raster memory means, for first directing coordinates from said first determining means in response to a favorable determination to said raster memory means first portion while said outputting means obtains coordinates from aid raster memory means second portion until all vectors in said vector memory means have been processed by said second selecting means and said first determining means and said outputting means has output all of said coordinates in said raster memory means second portion, and then directing coordinates from said first determining means in response to a favorable determination to said raster memory means second portion while said outputting means obtains coordinates from said raster memory means first portion.

68. Apparatus for rasterizing vectors in a predetermined space comprising:

means for identifying all vectors which have at least a portion in a selected one of a plurality of first particular areas within said space and for serially selecting each of said first particular areas until all of said space has been covered;

first means, coupled to said identifying and selecting means, for serially selecting each of a plurality of second particular areas within said selected first particular area until the entire said selected first particular area has been covered;

second means, coupled to said identifying and selecting means, for serially selecting each of said vectors identified by said identifying and selecting means until all of said vectors in said selected first particular area have been selected for each second particular area;

means, coupled to said second selecting means, for determining the coordinates of a plurality of points in each of said selected vectors;

means, coupled to said determining means, for comparing higher order bits of binary representations of at least one dimension of said coordinates with a predetermined number to determine whether said coordinates are within said selected second particular area;

means, coupled to said comparing means, for retaining said coordinates favorably compared by said comparing means; and means, coupled to said retaining means, for outputting said coordinates retained by said retaining means after said third selecting means has selected all of said identified vectors for one of said second particular areas.

69. Apparatus as in claim 68 wherein:

said apparatus further comprises vector memory means, coupled to said identifying means, for serially storing all of said vectors in each of said first particular areas, said second selecting means being coupled to said vector memory means; and said means for retaining includes raster memory means for storing said coordinates retained by said retaining means.

70. Apparatus for rasterizing vectors in a predetermined space comprising:

means for identifying all vectors which have at least a portion in a corresponding one of a plurality of first particular areas within said space and for serially selecting one of said first particular areas until all of said space has been covered;

first means, coupled to said identifying and selecting means, for serially selecting each of a plurality of second particular areas within said selected first particular area until all of said selected first particular area has been covered;

second means, coupled to said identifying and selecting means, for serially selecting each of said vectors in said selected first particular area until all of said vectors in said selected first particular area have been selected for each second particular area;

a first counter;

a second counter;

means, coupled to said second selecting means and said first counter, for loading a first dimension coordinate of the origin of said selected vector into said first counter;

means, coupled to said second selecting means and said second counter, for loading a second dimension coordinate of the origin of said selected vector into said second counter;

means, coupled to said first and second counters, for incrementally changing at least one of said first and second counters so that the output of said first and second counters represents coordinates of points in said selected vector;

means, coupled to said first and second counters, for determining whether said coordinates at said first and second counter outputs are within said selected second particular area;

means, coupled to said determining means and said first and second counters, for retaining said first and second counter outputs in response to a favorable determination; and means, coupled to said retaining means, for outputting said retained coordinates after said third selecting means has selected all of said vectors for one of said second particular areas.

71. Apparatus for rasterizing vectors in a predetermined space comprising:

means for identifying groups of vectors, each of said groups including all vectors which have at least a portion in a selected one of a plurality of first particular areas within said space;

vector memory means, coupled to said identifying means, for serially storing representations of each of said groups of vectors until said vectors in all of said particular areas have been stored;

first means for serially selecting each of a plurality of second particular areas within each said first particular area;

second means, coupled to said vector memory means, for serially selecting each of said vectors identified by said identifying means and stored in said vector memory means until all of said vectors in said selected first particular area have been selected for each second particular area;

a first counter;

a second counter;

means, coupled to said vector memory means and said first counter, for loading a first dimension coordinate of the origin of said selected vector into said first counter;

means, coupled to said vector memory means and said second counter, for loading a second dimension coordinate of the origin of said selected vector into said second counter;

means, coupled to said first and second counters; for incrementally changing at least one of said first and second counters so that the output of said first and second counters represents coordinates of points in said selected vector;

means, coupled to said first and second counters, and said first selecting means, for determining whether said coordinates at said first and second counter outputs are within said selected second particular area;

raster memory means, coupled to said determining means and said first and second counters, for storing said first and second counter outputs in response to a favorable determination; and means, coupled to said raster memory means, for outputting the contents of said raster memory means after all vectors in said selected first particular area and stored in said vector memory means have been selected for one of said second particular areas.

72. Apparatus as in claim 71 wherein:

said raster memory means and said vector memory means each includes first and second portions; and said apparatus further comprises:

means, coupled to said vector memory means, for first directing vectors from said identifying means to said vector memory means first portion while said second selecting means selects vectors from said vector memory means second portion until said identifying means has identified all vectors in one of said first particular areas and said second selecting means has selected all of said vectors in said vector memory means second portion, and then directing vectors from said identifying means to said vector memory means second portion while said second selecting means selects vectors from said vector memory means first portion, and means, coupled to said raster memory means, for first directing coordinates from said first and second counters in response to a favorable determination to said raster memory means first portion while said outputting means obtains coordinates from said raster memory means second portion until all vectors in said vector memory means have been processed by the plurality of said loading means and said incrementing means and said outputting means has output all of said vectors in said raster memory means second portion, and then directing coordinates from said first and second counters in response to a favorable determination to said raster memory means second portion while said outputting means obtains coordinates from said raster memory means first portion.

73. Apparatus for rasterizing vectors in a predetermined space comprising:

means for identifying groups of vectors, each of said groups including all vectors which have at least a portion in a selected one of a plurality of first particular areas within said space;

vector memory means, coupled to said identifying means, for serially storing representations of each of said groups of vectors until said vectors in all of said first particular areas have been stored;

first means for serially selecting each of a plurality of second particular areas within each said first particular area;

second means, coupled to said vector memory means, for serially selecting each of said vectors stored in said vector memory means until all of said vectors in said selected first particular area have been selected for each said second particular area;

a first counter;

a second counter;

means, coupled to said vector memory means and said first counter, for loading a first dimension coordinate of the origin of said selected vector into said first counter;

means, coupled to said vector memory means and said second counter, for loading a second dimension coordinate of the origin of said selected vector into said second counter;

means, coupled to said first and second counters, for incrementally changing at least one of said first and second counters so that the output of said first and second counters represents coordinates of points in said selected vector;

means, coupled to said first selecting means and at least one of said first and second counters, for comparing outputs of at least one of said first and second counters with a predetermined number to determine if said coordinates at said first and second counter outputs are within said selected second particular area;

raster memory means, coupled to said comparing means and said first and second counters, for storing said first and second counter outputs in response to a favorable comparison; and means, coupled to said raster memory means, for outputting the contents of said raster memory means after all vectors in said selected first particular area and stored in said vector memory means have been selected for one of said second particular areas.

74. Apparatus for rasterizing vectors in a predetermined space comprising:

means for identifying groups of vectors, each of said groups including all vectors which have at least a portion in a selected one of a plurality of first particular areas within said space;

vector memory means, coupled to said identifying means, for serially storing representations of each of said groups of vectors until said vectors in all of said first particular areas have been stored;

means for serially storing raster band numbers, each representative of a selected second particular area within each said first particular area;

means, coupled to said vector memory means, for serially selecting each of said vectors stored in said vector memory means until all of said vectors in said selected first particular area have been selected for each second particular area corresponding to a number stored in said raster band storing means;

a first counter;

a second counter;

means, coupled to said vector memory means and said first counter, for loading a first dimension coordinate of the origin of said selected vector into said first counter;

means, coupled to said vector memory means and said second counter, for loading a second dimension coordinate of the origin of said selected vector into said second counter;

a first register;

a second register;

means, coupled to said vector memory means and said first register, for loading the change in said first dimension between the origin and end of said selected vector in said first register;

means, coupled to said vector memory means and said second register, for loading the change in said second dimension between the origin and end of said selected vector in said second register;

means, coupled to said first and second counters and said first and second registers, for incrementally changing at least one of said first and second counters in accordance with the Bresenham method, the output of said first and second counters representing coordinates of points in said selected vector;

means, coupled to said storing means and at least one of said first and second counters, for comparing higher order bits of at least one of said first and second counter outputs with one of said raster band numbers to determine if said coordinates at said first and second counter outputs are within said selected second particular area;

raster memory means, coupled to said comparing means and said first and second counters, for storing said first and second counter outputs in response to a favorable comparison; and means, coupled to said raster memory means, for outputting the contents of said raster memory means after all vectors in said selected first particular area and stored in said vector memory means have been selected for one of said second particular areas.

75. Apparatus as in claim 60 or 74 wherein said first and second particular areas have one dimension the same as one dimension of said space.

76. Apparatus as in claim 74 wherein said incremental changing means further comprises:

a first multiplexer having a first input coupled to said first register;

a second multiplexer having a first input coupled to said second register;

a third register coupled to an output of said first multiplexer;

a fourth register coupled to an output of said second multiplexer;

means, coupled to said third register and said second multiplexer, for transmitting the output of said third register to a second input of said second multiplexer;

means, coupled to said fourth register and said first multiplexer, for transmitting the output of said fourth register to a second input of said first multiplexer;

an AND gate having one input coupled to the output of said fourth register;

first arithmetic means having a first input coupled to the output of said third register and a second input coupled to the output of said AND gate, said arithmetic means producing an output related to the difference between said first input and said second input, the most significant bit of an output of said arithmetic means controlling said first and second multiplexers;

second arithmetic means having a first input coupled to said first arithmetic means output and a second input, said second arithmetic means producing an output related to the sum of said first and second inputs, another input of said AND gate and said first and second counters being coupled to said second arithmetic means output; and an accumulator coupled to the output of said second arithmetic means, said second arithmetic means second input being coupled to the output of said accumulator.

77. Apparatus for rasterizing vectors in a predetermined space comprising:

means for identifying groups of vectors, each of said groups including all vectors which have at least a portion in a selected one of a plurality of first particular areas within said space;

vector memory means, coupled to said identifying means, for serially storing representations of each of said groups of vectors until said vectors in all of said first predetermined particular areas have been stored, said vector memory means having first and second portions;

means for serially storing raster band numbers, each representative of a selected second particular area within each said first particular area;

means, coupled to said vector memory means, for serially selecting each of said vectors stored in said vector memory means until all of said vectors in said selected first particular area have been selected for each second particular area corresponding to a number stored in said raster band number storing means;

means, coupled to said vector memory means, for first directing vectors from said identifying means to said vector memory means first portion while said selecting means selects vectors from said vector memory means second portion until said identifying means has identified all vectors in one of said first particular areas and said selecting means has selected all of said vectors in said vector memory means second portion, and then directing vectors from said identifying means to said vector memory means second portion while said selecting means selects vectors from said vector memory means first portion;

a first counter;

a second counter;

means, coupled to said vector memory means and said first counter, for loading a first dimension coordinate of the origin of said selected vector into said first counter;

means, coupled to said vector memory means and said second counter, for loading a second dimension coordinate of the origin of said selected vector into said second counter;

a first register;

a second register;

means, coupled to said vector memory means and said first register, for loading the change in said first dimension between the origin and end of said selected vector in said first register;

means, coupled to said vector memory means and said second register, for loading the change in said second dimension between the origin and end of said selected vector in said second register;

means, coupled to said first and second counters and said first and second registers, for incrementally changing at least one of said first and second counters in accordance with the Bresenham method, the output of said first and second counters representing coordinates of points in said selected vector;

means, coupled to said storing means and at least one of said first and second counters, for comparing higher order bits of at least one of said first and second counters outputs with one of said raster band numbers to determine if said coordinates at said first and second counter outputs are within said selected second particular area;

raster memory means, coupled to said comparing means and said first and second counters, for storing said first and second counter outputs in response to a favorable comparison, said raster memory means including first and second portions;

means, coupled to said raster memory means, for outputting the contents of said raster memory means after all vectors stored in said vector memory means have been selected for one of said second particular areas; and means, coupled to said raster memory means, for first directing coordinates from said first and second counters, in response to a favorable comparison, to said raster memory means first portion while said outputting means obtains coordinates from said raster memory means second portion until all vectors in one of said first and second portions of said vector memory means have been processed by the plurality of said loading means and said incrementing means and said outputting means has output all of said vectors in said raster memory means second portion, and then directing coordinates from said first and second counters, in response to a favorable comparison, to said raster memory means second portion while said outputting means obtains coordinates from said raster memory means first portion.

* * * * *